US011978298B2

(12) United States Patent
Oana et al.

(10) Patent No.: US 11,978,298 B2
(45) Date of Patent: May 7, 2024

(54) MAGNETIC SHEET AND MANUFACTURING METHOD THEREOF

(71) Applicant: SEIKO EPSON CORPORATION, Tokyo (JP)

(72) Inventors: Sotaro Oana, Nagano (JP); Makoto Omura, Nagano (JP); Toshiaki Yamagami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 17/485,582

(22) Filed: Sep. 27, 2021

(65) Prior Publication Data

US 2022/0101677 A1 Mar. 31, 2022

(30) Foreign Application Priority Data

Sep. 28, 2020 (JP) .................. 2020-162202

(51) Int. Cl.
*G07D 7/04* (2016.01)
*B32B 3/08* (2006.01)
*B32B 5/02* (2006.01)
*B32B 29/02* (2006.01)
*H01F 41/14* (2006.01)
*H01F 41/16* (2006.01)

(52) U.S. Cl.
CPC .................. *G07D 7/04* (2013.01); *B32B 3/08* (2013.01); *B32B 3/085* (2013.01); *B32B 5/022* (2013.01); *B32B 29/02* (2013.01); *H01F 41/14* (2013.01); *H01F 41/16* (2013.01); *B32B 2264/10* (2013.01); *B32B 2307/208* (2013.01); *B32B 2554/00* (2013.01); *Y10T 428/32* (2015.01)

(58) Field of Classification Search
None
See application file for complete search history.

(56) References Cited

U.S. PATENT DOCUMENTS

| | | | |
|---|---|---|---|
| 2015/0352883 A1* | 12/2015 | Schmid | B05D 3/20 283/73 |
| 2020/0149224 A1* | 5/2020 | Fuse | D21H 27/00 |
| 2020/0190743 A1* | 6/2020 | Yamagami | D21H 21/18 |
| 2021/0308718 A1* | 10/2021 | Nikseresht Ghanepour | B42D 25/369 |
| 2022/0144005 A1* | 5/2022 | Loginov | G06F 21/34 |

FOREIGN PATENT DOCUMENTS

| | | | | |
|---|---|---|---|---|
| EP | 2518737 A1 * | 10/2012 | ........... | B42D 25/369 |
| JP | 2020-097802 A | 6/2020 | | |

* cited by examiner

*Primary Examiner* — Kevin M Bernatz
(74) *Attorney, Agent, or Firm* — Global IP Counselors, LLP

(57) ABSTRACT

A magnetic sheet includes a sheet, line-shaped N first magnetic members arranged on the sheet and having magnetic properties, and line-shaped N second magnetic members arranged on the sheet and having magnetic properties, where N denotes the number of the first magnetic members and denotes the number of the second magnetic members.

5 Claims, 19 Drawing Sheets

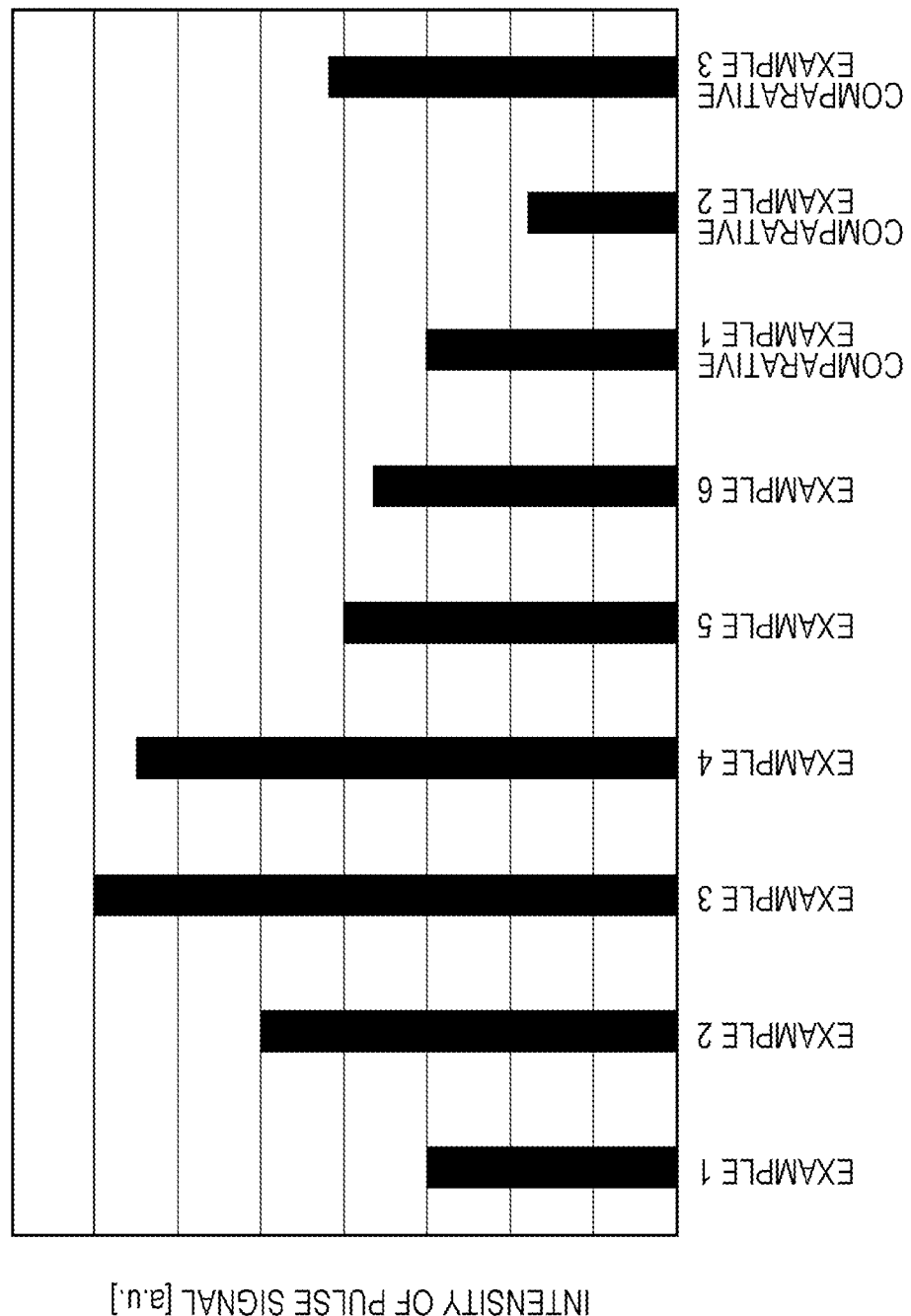

MAGNETIC SHEET AND MANUFACTURING METHOD THEREOF

The present application is based on, and claims priority from JP Application Serial Number 2020-162202, filed Sep. 28, 2020, the disclosure of which is hereby incorporated by reference herein in its entirety.

BACKGROUND

1. Technical Field

Embodiments of the present disclosure relate to a magnetic sheet and a manufacturing method thereof.

2. Related Art

In related art, the use of a special kind of paper called as security paper has been proposed as one methods for enhancing security. Security paper is, for example, produced by embedding magnetic wires in a sheet material in a papermaking process. When an alternating magnetic field having a predetermined frequency is applied to this type of paper, the magnetic wire embedded in the paper emits a steep pulse signal due to magnetization reversal. By detecting the pulse signal using a detection device, it is possible to detect the presence of the paper that includes the magnetic wires.

As an example of such security paper, JP-A-2020-097802 discloses a recording sheet in which nine magnetic wires are arranged in three directions.

For the purpose of heightening the detection sensitivity of a detection device, there is a demand for increasing the intensity of a pulse signal that is generated from security paper such as one described above. However, if the number of magnetic wires is increased so as to increase the intensity of a pulse signal, its cost will also increase.

SUMMARY

A magnetic sheet according to a certain aspect of the present disclosure includes: a sheet; and line-shaped N first magnetic members arranged on the sheet and having magnetic properties, and line-shaped N second magnetic members arranged on the sheet and having magnetic properties, where N denotes number of the first magnetic members and denotes number of the second magnetic members; wherein one of the N first magnetic members is arranged along a second axis when viewed in a direction of a first axis that is perpendicular to a principal plane of the sheet, among the N first magnetic members, first magnetic members other than the one arranged along the second axis are arranged along third axes, number of which is denoted as (N-1), wherein the third axes are located at respective positions obtained by rotating the second axis at angular intervals of $(M\pm5)°$ when viewed in the direction of the first axis, and one of the N second magnetic members is arranged along a fourth axis that is located at a position obtained by rotating the second axis by a rotation angle $\theta$, and second magnetic members other than the one are arranged along fifth axes that are located at respective positions obtained by rotating the third axes by the rotation angle $\theta$ respectively, with the first axis taken as the center of rotation, where, N is an odd number that is equal to or greater than 3, M satisfies an equation $M=(360/N)°$, and $\theta$ is not $M/2°$.

A method for manufacturing a magnetic sheet according to a certain aspect of the present disclosure includes: arranging, on a sheet, line-shaped N first magnetic members having magnetic properties, where N denotes number of the first magnetic members; and arranging, on the sheet, line-shaped N second magnetic members having magnetic properties, where N denotes number of the second magnetic members; wherein in the arranging of the first magnetic members and the arranging of the second magnetic members, one of the N first magnetic members is arranged along a second axis when viewed in a direction of a first axis that is perpendicular to a principal plane of the sheet, among the N first magnetic members, first magnetic members other than the one arranged along the second axis are arranged along third axes, number of which is denoted as (N-1), wherein the third axes are located at respective positions obtained by rotating the second axis at angular intervals of $(M\pm5)°$ when viewed in the direction of the first axis, and one of the N second magnetic members is arranged along a fourth axis that is located at a position obtained by rotating the second axis by a rotation angle $\theta$, and second magnetic members other than the one are arranged along fifth axes that are located at respective positions obtained by rotating the third axes by the rotation angle $\theta$ respectively, with the first axis taken as the center of rotation, where, N is an odd number that is equal to or greater than 3, M satisfies an equation $M=(360/N)°$, and $\theta$ is not $M/2°$.

BRIEF DESCRIPTION OF THE DRAWINGS

FIG. 19 is a graph that shows the pulse signal intensity of Examples 1 to 6 and Comparative Examples 1 to 3.

DESCRIPTION OF EXEMPLARY EMBODIMENTS

With reference to the accompanying drawings, a certain non-limiting advantageous embodiment of the present disclosure will now be explained in detail. The specific embodiment described below shall never be construed to unduly limit the scope of the present disclosure recited in the appended claims. Not all of components described below necessarily constitute indispensable parts of the present disclosure.

1. First Embodiment

1.1. Fibrous Body Manufacturing Apparatus

1.1.1. Overall Configuration

Figure 1:
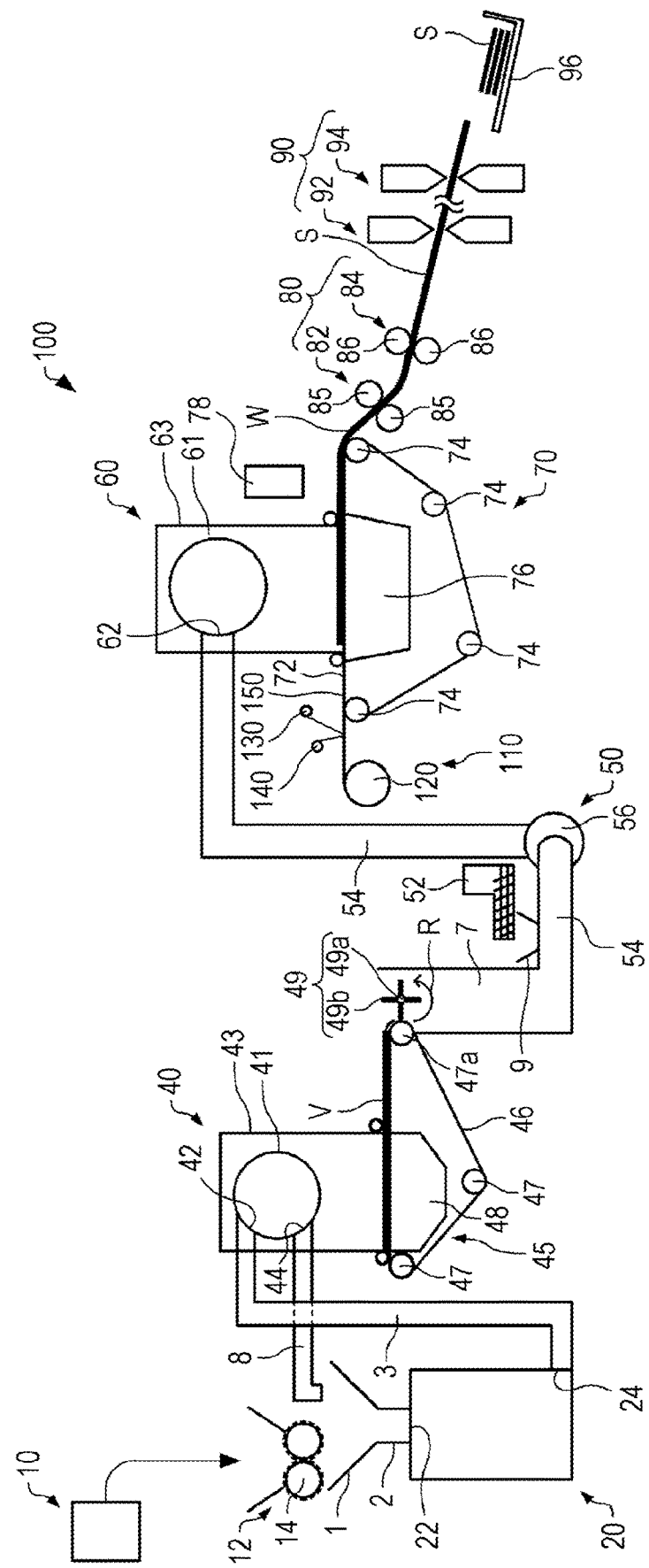
FIG. 1 is a schematic view of a fibrous body manufacturing apparatus according to a first embodiment.

First, with reference to the accompanying drawings, a fibrous body manufacturing apparatus according to a first embodiment will now be explained. FIG. 1 is a schematic view of a fibrous body manufacturing apparatus 100 according to a first embodiment.

As illustrated in FIG. 1, the fibrous body manufacturing apparatus 100 includes, for example, a supplying unit 10, a coarse crushing unit 12, a defibrating unit 20, a screening unit 40, a first web forming unit 45, a rotator 49, a mixing unit 50, a deposition unit 60, a second web forming unit 70, a sheet forming unit 80, and a cutting unit 90.

The supplying unit 10 supplies a raw material to the coarse crushing unit 12. For example, the supplying unit 10 is an automatic feeder for successive inputs of a raw material into the coarse crushing unit 12. The raw material supplied by the supplying unit 10 contains fibers, for example, fibers of waste paper or pulp sheets.

The coarse crushing unit 12 shreds the raw material supplied by the supplying unit 10 into small pieces under atmospheric conditions, for example, in air. The small pieces are, for example, pieces of a few square centimeters. In the illustrated example, the coarse crushing unit 12 has coarse crushing blades 14, and is able to shred the inputted raw material by means of the coarse crushing blades 14. For example, a shredder is used as the coarse crushing unit 12. After shredding by the coarse crushing unit 12, the raw material is received by a hopper 1, and is sent to the defibrating unit 20 through a pipe 2.

The defibrating unit 20 defibrates the raw material shredded by the coarse crushing unit 12. The term "defibrate" as used herein means the act of disentangling a raw material made up of fibers bound to one another into individual unbound pieces. In addition to the defibrating function, the defibrating unit 20 has a function of separating, from the fibers, resin particles adhering to the raw material, and other substances adhering thereto such as ink, toner, and blurring inhibitor, etc.

The output from the defibrating unit 20 is called as "defibrated material". The "defibrated material" sometimes contains, in addition to defibrated fibers, resin particles separated from the fibers in the process of defibration, a colorant such an ink, toner, etc., an additive such as blurring inhibitor, paper-strengthening agent, etc. The defibrated material has a string shape or a ribbon shape. The defibrated material may be in a state in which it is not intertwined with any other defibrated fiber, that is, in an independent state. Alternatively, the defibrated material may be in a state of so-called "lump", in which it is intertwined with other defibrated material.

The defibrating unit 20 performs dry defibration. The term "dry" as used herein means a method in which processing such as defibration is performed under atmospheric conditions, for example, in air, not in a liquid. An impeller mill, for example, is used as the defibrating unit 20. The defibrating unit 20 has a function of producing a flow of air for sucking in the raw material and putting out the defibrated material. By utilizing such a self-produced flow of air, the defibrating unit 20 is able to suck in the raw material through an inlet 22 together with the airflow, perform defibration, and then transport the defibrated material to an outlet 24. The defibrated material outputted from the defibrating unit 20 is sent to the screening unit 40 through a pipe 3. The flow of air produced by the defibrating unit 20 may be used also for transporting the defibrated material from the defibrating unit 20 to the screening unit 40. Alternatively, an airflow producing device such as a blower may be provided, and the airflow of the blower may be used for transporting the defibrated material from the defibrating unit 20 to the screening unit 40.

The defibrated material defibrated by the defibrating unit 20 goes into the screening unit 40 through an inlet 42, and is screened thereat on the basis of fiber lengths. The screening unit 40 has, for example, a drum portion 41 and a housing portion 43. The drum portion 41 is housed in the housing portion 43. For example, a sieve is used as the drum portion 41. The drum portion 41 has a net, and is able to sort the inputted defibrated material into a first screened material and a second screened material. The first screened material is made up of fibers or particles that are smaller than the meshes of the net, that is, those whose size is small enough to pass through the net. The second screened material is made up of fibers that are larger than the meshes of the net, yet-to-be-defibrated pieces, and lumps, that is, those whose size is not small enough to pass through the net. The first screened material is sent to the deposition unit 60 through a pipe 7. The second screened material is put out from an outlet 44 to be returned to the defibrating unit 20 through a pipe 8. Specifically, the drum portion 41 is a cylindrical sieve that is driven to rotate by a motor. Examples of the net of the drum portion 41 are: a wire net, an expanded metal net formed by pulling and expanding a metal plate having slits, and a punched metal net formed by punching holes through a metal plate by using a punching press machine, etc.

The first web forming unit 45 transports, to the pipe 7, the first screened material outputted from the screening unit 40. For example, the first web forming unit 45 includes a mesh belt 46, tensioning rollers 47, and a suction mechanism 48.

The suction mechanism 48 is able to suck, onto the surface of the mesh belt 46, the first screened material dispersed in air after passing through the opening of the screening unit 40. The first screened material accumulates on the mesh belt 46 that is moving, thereby forming into a web V thereon. The basic configuration of the mesh belt 46, the tensioning rollers 47, and the suction mechanism 48 is the same as that of a mesh belt 72, tensioning rollers 74, and a suction mechanism 76 of the second web forming unit 70 described later.

The web V formed by going through the processes performed by the screening unit 40 and the first web forming unit 45 contains a lot of air and is therefore soft and slightly bulky. The web V formed by accumulation on the mesh belt 46 is put into the pipe 7 and is then transported to the deposition unit 60.

The rotator 49 is able to cut the web V. In the illustrated example, the rotator 49 has a base portion 49a and a protruding portion 49b. The protruding portion 49b protrudes from the base portion 49a. The protruding portion 49b has, for example, a plate-like shape. In the illustrated example, the protruding portion 49b is made up of four protrusions. The four protrusions 49b are provided at equal intervals. The base portion 49a rotates in a direction R. Due to this rotation, the protruding portion 49b is able to rotate around the base portion 49a. By cutting the web V by the rotator 49, for example, it is possible to reduce fluctuations in the amount of the defibrated material supplied to the deposition unit 60 per unit time.

The rotator 49 is provided near the first web forming unit 45. In the illustrated example, the rotator 49 is provided near the tensioning roller 47a located on the downstream position of the path of the web V. The rotator 49 is provided at a position where the protruding portion 49b is able to come into contact with the web V but does not come into contact with the mesh belt 46 on which the web V is deposited. Therefore, it is possible to prevent the mesh belt 46 from being abraded by the protruding portion 49b. The minimum distance between the protruding portion 49b and the mesh belt 46 is, for example, 0.05 mm or more and 0.5 mm or less. With this distance, it is possible to cut the web V without damaging the mesh belt 46.

The mixing unit 50 mixes the first screened material, which has passed through the net of the screening unit 40, with an additive that contains resin. The mixing unit 50 includes, for example, an additive supply portion 52, which supplies the additive, a pipe 54, through which the first screened material and the additive are transported, and a blower 56. In the illustrated example, the additive is supplied from the additive supply portion 52 into the pipe 54 via a hopper 9. The pipe 54 is connected from the pipe 7.

In the mixing unit 50, the blower 56 produces a flow of air, and the first screened material and the additive are transported while being mixed with each other inside the pipe 54. The mechanism for mixing the first screened material with the additive is not specifically limited. For example, a propeller that rotates at a high speed may be used for stirring them. A pipe having internal blades may rotate to behave as such a mixer.

A screw feeder illustrated in FIG. 1, or a disk feeder that is not illustrated, etc. can be used as the additive supply portion 52. The additive supplied from the additive supply portion 52 contains resin for bonding the fibers to one another. At the point in time of the supply of the resin, the fibers have not been bonded yet. The resin melts during the process of passing through the sheet forming unit 80. The molten resin bonds the fibers together.

The resin supplied from the additive supply portion 52 is thermoplastic resin or thermosetting resin. Examples of this resin are: AS (Acrylonitrile Styrene) resin, ABS (Acrylonitrile Butadiene Styrene) resin, polypropylene, polyethylene, polyvinyl chloride, polystyrene, acrylic resin, polyester, polyethylene terephthalate, polyphenylene ether, polybutylene terephthalate, nylon, polyamide, polycarbonate, polyacetal, polyphenylene sulfide, polyetherether ketone, and the like. Any of these kinds of resin may be used alone, or a mixture of any of them may be used. The additive supplied from the additive supply portion 52 may be fibrous or powdery.

The additive supplied from the additive supply portion 52 may contain, in addition to the binder resin for bonding the fibers together, a colorant for coloring the fibers, an agglomeration inhibitor for inhibiting the agglomeration of the fibers, an aggregation inhibitor for inhibiting the aggregation of resin molecules, a flame retardant that makes the fibers, etc. incombustible, depending on the type of sheets to be manufactured. The mixture outputted from the mixing unit 50 is sent to the deposition unit 60 through the pipe 54.

The mixture outputted from the mixing unit 50 goes into the deposition unit 60 through an inlet 62. The deposition unit 60 disentangles the intertwined defibrated material, and lets them fall while dispersing them in air. If the resin of the additive supplied from the additive supply portion 52 is fibrous, the deposition unit 60 disentangles the intertwined resin. By this means, the deposition unit 60 is able to form a uniform deposition of the mixture on the second web forming unit 70.

The deposition unit 60 has, for example, a drum portion 61 and a housing portion 63. The drum portion 61 is housed in the housing portion 63. A rotatable cylindrical sieve is used as the drum portion 61. The drum portion 61 has a net, and lets fibers or particles that are smaller than the meshes of the net fall among those included in the mixture outputted from the mixing unit 50. The structure of the drum portion 61 is, for example, the same as the structure of the drum portion 41.

The "sieve" of the drum portion 61 does not necessarily have to have any particular target screening function. That is, the "sieve" used as the drum portion 61 just means a mechanism equipped with a net, and the drum portion 61 may let all of those included in the mixture inputted into the drum portion 61 fall.

The second web forming unit 70 forms a web W by deposition of the output from the deposition unit 60 on itself. The second web forming unit 70 includes, for example, the aforementioned mesh belt 72, tensioning rollers 74, and suction mechanism 76.

The material having passed through the opening of the deposition unit 60 accumulates on the mesh belt 72. The mesh belt 72 is stretched around the tensioning rollers 74. The mesh belt 72 is permeable to air, but is not permeable to the material having passed through the opening of the deposition unit 60. The mesh belt 72 moves due to the rotation of the tensioning rollers 74. The material having passed through the opening of the deposition unit 60 falls and accumulates one after another while the mesh belt 72 moves continuously. As a result, the web W is formed on the mesh belt 72.

The suction mechanism 76 is provided under the mesh belt 72. The suction mechanism 76 is able to produce a downward flow of air. Because of the airflow produced by the suction mechanism 76, it is possible to suck the mixture dispersed in air by the deposition unit 60 onto the mesh belt 72. By this means, it is possible to increase the speed of discharge from the deposition unit 60. Moreover, it is possible to form a downward flow, by the suction mechanism 76, in the path of fall of the mixture; therefore, it is possible to prevent the defibrated material and the additive from becoming entangled while they fall.

Since the web W is formed by going through the processes performed by the deposition unit 60 and the second web forming unit 70 as described above, the web W contains a lot of air and is therefore soft and slightly bulky. The web W formed by deposition on the mesh belt 72 is transported to the sheet forming unit 80.

In the illustrated example, a moisture adjusting unit 78 for adjusting the moisture of the web W is provided. The moisture adjusting unit 78 is able to adjust ambient humidity and the ratio of the web W to water by adding the water, water vapor, or mist to the web W.

The sheet forming unit 80 forms a sheet S by pressing and heating the web W, which has been formed by deposition on the mesh belt 72. At the sheet forming unit 80, heat is applied to the mixture of the defibrated material and the additive in the web W. By this means, it is possible to bond the fibers contained in the mixture to one another by means of the additive.

The sheet forming unit 80 includes a pressing portion 82, which presses the web W, and a heating portion 84, which heats the web W pressed by the pressing portion 82. The pressing portion 82 is made up of a pair of rollers 85. The pressing portion 82 applies pressure to the web W. The pressing decreases the thickness of the web W and increases the bulk density of the web W. Heating rollers, a heat press shaping machine, hot plates, a hot air blower, an infrared heater, or a flash fixation device, for example, can be used as the heating portion 84. In the illustrated example, the heating portion 84 has a pair of heating rollers 86. Since the heating portion 84 is configured as the heating rollers 86, as compared with a case where the heating portion 84 is configured as a plate-type pressing device, it is possible to shape the sheet S while transporting the web continuously. The rollers 85 and the heating rollers 86 are arranged such that, for example, their rotation shafts are in parallel with one another. The rollers 85 are able to apply, to the web W, pressure that is higher than pressure applied by the heating rollers 86 to the web W. The number of the rollers 85 is not specifically limited. The number of the heating rollers 86 is also not specifically limited.

The cutting unit 90 cuts the sheet S produced by the sheet forming unit 80. In the illustrated example, the cutting unit 90 includes a first cutting portion 92, which cuts the sheet S in the direction orthogonal to the direction of transportation of the sheet S, and a second cutting portion 94, which cuts the sheet S in the direction parallel to the transportation direction. For example, the second cutting portion 94 cuts the sheet S having passed through the first cutting portion 92.

The sheet S that has predetermined single-cut size is produced through the above process. The single-cut sheet S is ejected to an ejected sheet receiver 96.

1.1.2. Putting-Out Unit

Figure 2:
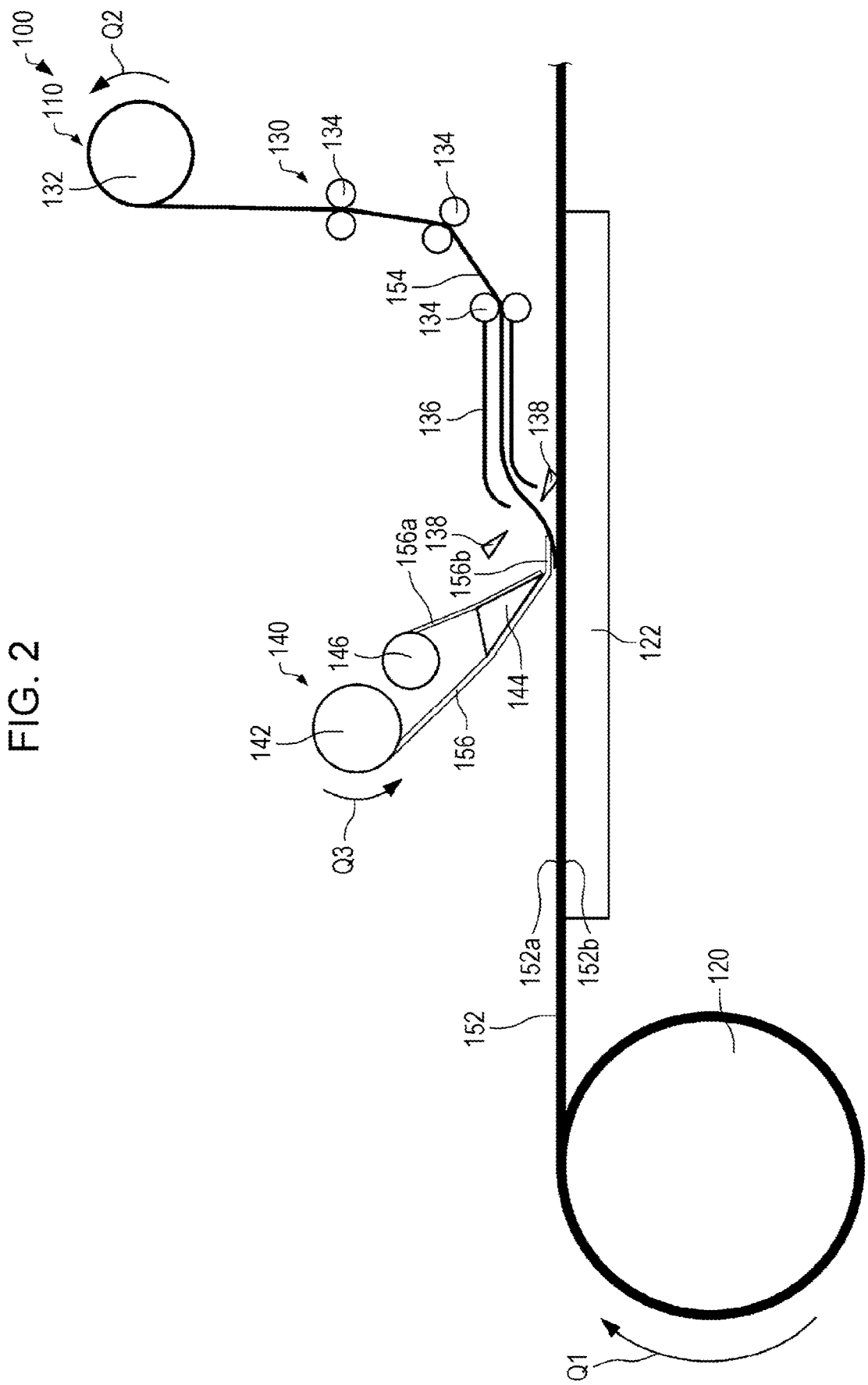
FIG. 2 is a schematic view of a putting-out unit of the fibrous body manufacturing apparatus according to the first embodiment.
Figure 3:
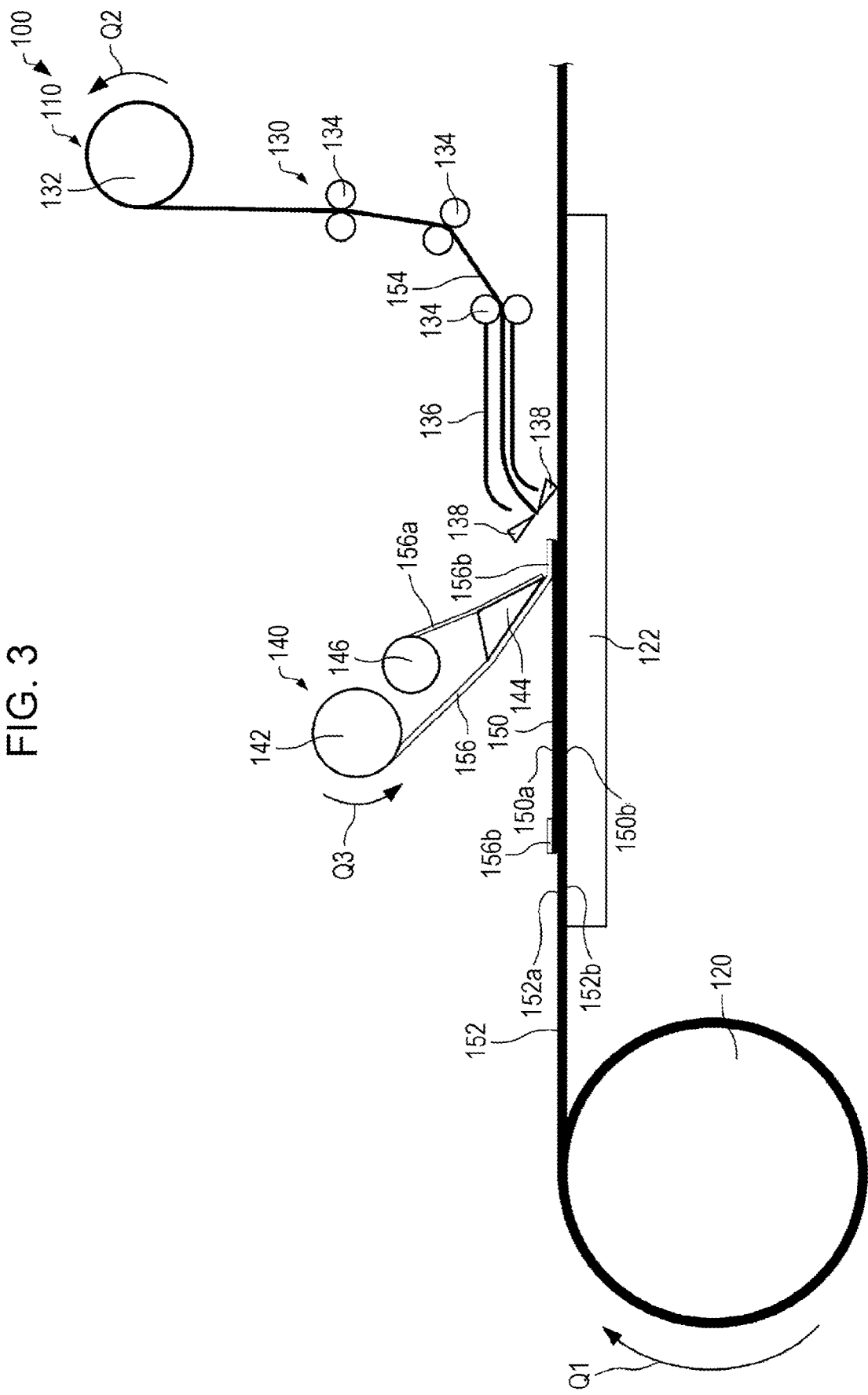
FIG. 3 is a schematic view of the putting-out unit of the fibrous body manufacturing apparatus according to the first embodiment.

The fibrous body manufacturing apparatus 100 includes a putting-out unit 110. Each of FIGS. 2 and 3 is a schematic view of the putting-out unit 110 of the fibrous body manufacturing apparatus 100. To facilitate an explanation, in FIG. 1, the illustration of the putting-out unit 110 is simplified. A state after a predetermined time has elapsed from a state illustrated in FIG. 2 is illustrated in FIG. 3.

As illustrated in FIGS. 1, 2, and 3, for example, the putting-out unit 110 includes a first supplying roll 120, a first placing portion 130, and a second placing portion 140. The putting-out unit 110 puts a ground sheet 150 out onto the mesh belt 72. The mesh belt 72 is an example of a transportation unit that transports the ground sheet 150 put out onto itself.

The first supplying roll 120 is a roll of a base sheet 152. The first supplying roll 120 rotates in a direction Q1 when driven by a driving mechanism that is not illustrated. Due to this rotation, the base sheet 152 constituting the first supplying roll 120 is unreeled therefrom and moves toward the mesh belt 72. In the example illustrated in FIGS. 2 and 3, the unreeled part of the first supplying roll 120 is placed on a table 122. In FIG. 1, the table 122 is not illustrated. The base sheet 152 has one side 152a and the other side 152b, which is the opposite surface in relation to the one side 152. The other side 152b is in contact with the mesh belt 72. The material of the base sheet 152 will be described later.

The first placing portion 130 places a functional member 154 on the one side 152a of the base sheet 152. The first placing portion 130 includes, for example, a second supplying roll 132, rollers 134, a guide 136, and a cutter 138.

The second supplying roll 132 is a roll of the functional member 154, which has a sheet shape when not rolled. The second supplying roll 132 rotates in a direction Q2 when driven by a driving mechanism that is not illustrated. In the illustrated example, the direction Q2 is the opposite of the direction Q1. As illustrated in FIG. 2, the functional member 154 constituting the second supplying roll 132 travels through the rollers 134 and the guide 136 and is placed on the one side 152a of the base sheet 152. Then, as illustrated in FIG. 3, the functional member 154 is cut by the cutter 138 at a predetermined position. The material of the functional member 154 will be described later.

The second placing portion 140 places an adhesive tape 156 on the one side 152a of the base sheet 152. By doing so, the second placing portion 140 temporarily fixes a part of the functional member 154 onto the base sheet 152. The second placing portion 140 includes, for example, a third supplying roll 142, a cutter 144, and a base collecting roll 146.

The third supplying roll 142 is a roll of the adhesive tape 156, which has a sheet shape when not rolled. The adhesive tape 156 has a layered structure that includes a base 156a and a sticky portion 156b. The third supplying roll 142 rotates in a direction Q3, with the sticky portion 156b of the adhesive tape 156 pressed against the one side 152a of the base sheet 152. Due to this rotation, the adhesive tape 156 is unreeled by a predetermined length, the base 156a and the sticky portion 156b are separated from each other by the cutter 144, and the base 156a is reeled onto the base collecting roll 146. In the illustrated example, the direction Q3 is the opposite of the direction Q1. The sticky portion 156b of the adhesive tape 156, which constitutes the third supplying roll 142, is placed while temporarily fixing the functional member 154 to the one side 152a of the base sheet 152. Then, the adhesive tape 156 is cut by the cutter 144 at a predetermined position. The material of the adhesive tape 156 will be described later.

The putting-out unit 110 having the configuration described above puts the ground sheet 150 out onto the mesh belt 72, with the functional member 154 placed on the one side 152a of the base sheet 152. As illustrated in FIG. 1, the mesh belt 72 transports the ground sheet 150 put out onto itself, and the deposition unit 60 lets the mixture that includes the fibers and the binder fall and accumulate on one side 150a of the ground sheet 150 transported by the mesh belt 72, thereby forming the web W thereon. The suction mechanism 76, which is an example of a sucking unit, is provided below the other side 150b of the ground sheet 150. The sheet forming unit 80 is an example of a pressing and heating unit that applies pressure and heat to the web W. The one side 150a of the ground sheet 150 is oriented in the same direction as the one side 152a of the base sheet 152.

1.2. Sheet

Figure 4:
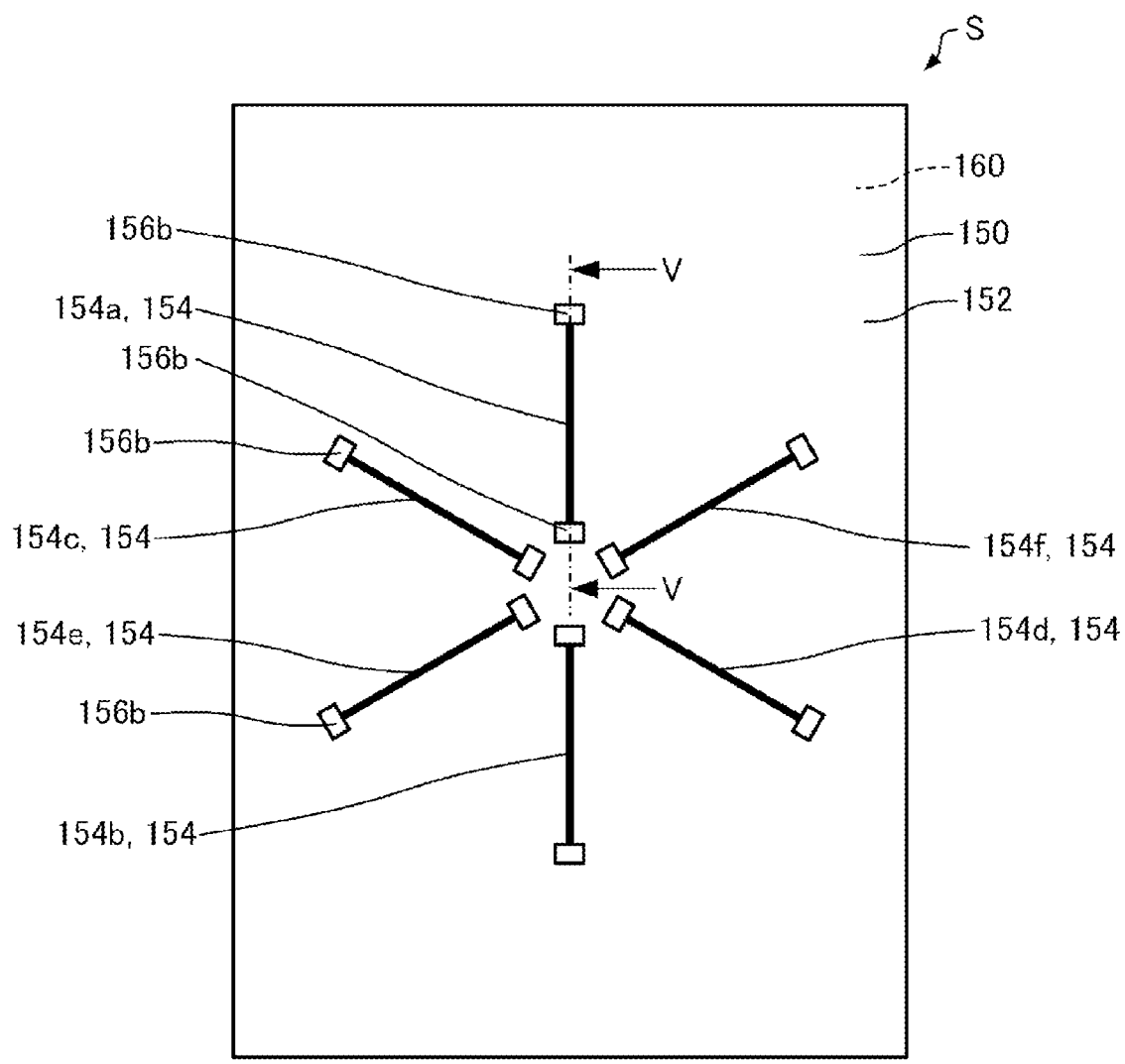
FIG. 4 is a schematic plan view of a sheet according to the first embodiment.
Figure 5:
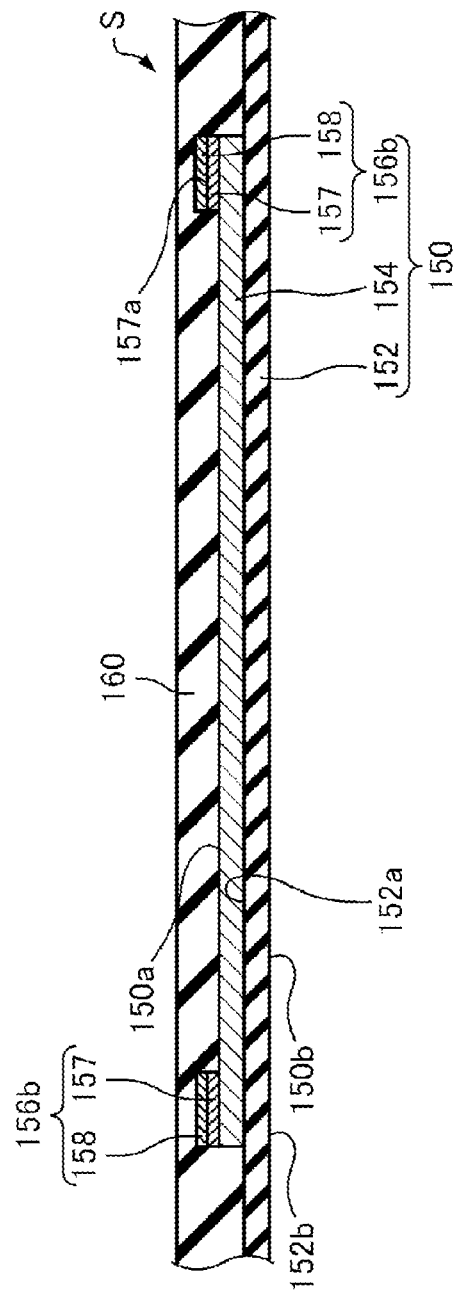
FIG. 5 is a schematic cross-sectional view of a sheet according to the first embodiment.

Next, with reference to the accompanying drawings, the sheet S manufactured by the fibrous body manufacturing apparatus 100 described above will now be explained. FIG. 4 is a schematic plan view of the sheet S according to the first embodiment. FIG. 5 is a schematic cross-sectional view of the sheet S according to the first embodiment, taken along the line V-V of FIG. 4.

The sheet S is a rectangular fibrous body cut by the cutting unit 90 into the size of, for example, A4. The sheet S is used as printing paper, and printing is performed thereon by a printer, similarly to plain paper, etc. The sheet S has a thickness of, for example, 50 μm or more and 200 μm or less. Preferably, the sheet S may have a thickness of 90 μm or more and 150 μm or less.

As illustrated in FIGS. 4 and 5, the sheet S includes the ground sheet 150 and a surface layer sheet 160. The ground sheet 150 includes the base sheet 152, the functional member 154, and the sticky portion 156*b*. The sheet S is a functional sheet that includes the functional member 154. To facilitate an explanation, in FIG. 4, the surface layer sheet 160 is illustrated in a see-through state.

The base sheet 152 is made of, for example, nonwoven fabric. Preferably, the nonwoven fabric of the base sheet 152 may be made up of fibers that have the same molecular structure as that of fibers discharged from the deposition unit 60. Examples of the fibers contained in the base sheet 152 are: cellulose fibers, rayon, cotton, linters, kapok, flax, hemp, and ramie. Any one of those enumerated here may be used alone, or two or more of them may be used in combination. A preferred example of the fibers contained in the base sheet 152 is cellulose fibers. Cellulose fibers are easily available and have excellent formability. Preferably, the cellulose fibers may be fibers derived from wood-based pulp. Examples of the wood-based pulp are: virgin pulp, Kraft pulp, bleached chemi-thermo mechanical pulp, synthetic pulp, or pulp derived from waste paper or recycled paper. Any one of those enumerated here may be used alone, or two or more of them may be used in combination.

The base sheet 152 is permeable to air. The term "air permeability" as used herein means the property of allowing air to pass through a plurality of pores. Preferably, the Gurley second, which indicates the degree of air permeability, of the base sheet 152 may be 30 seconds or less when measured using a Gurley permeability tester. More preferably, the Gurley second of the base sheet 152 may be 15 seconds or less.

The functional member 154 is disposed on the one side 152*a* of the base sheet 152. Specifically, the functional member 154 is bonded to the one side 152*a* of the base sheet 152 by an adhesive layer 157. The functional member 154 is, for example, a magnetic body made of a magnetic material. Specifically, the functional member 154 is a magnetic wire made of a magnetic material and having a length in the order of several millimeters or more. The sheet S includes, for example, a plurality of functional members 154. In the example illustrated in FIG. 4, the sheet S includes six functional members 154. These functional members 154 are arranged radially in a plan view. These functional members 154 do not overlap with one another in a plan view. In the example illustrated in FIG. 4, among the six functional members 154, functional members 154*a* and 154*b* have their longitudinal direction in a first direction, functional members 154*c* and 154*d* have their longitudinal direction in a second direction, which is inclined by 60° with respect to the first direction, and functional members 154*e* and 154*f* have their longitudinal direction in a third direction, which is inclined by 60° with respect to the first and second directions. The functional member 154*a* does not overlap with another functional member 154*b* in a plan view. For example, by moving the first placing portion 130 and the second placing portion 140 with respect to the base sheet 152 by a moving mechanism that is not illustrated, it is possible to arrange the functional members 154 at predetermined positions.

Since the sheet S includes the functional member 154 that is a magnetic wire, the sheet S can be used as security paper. The security paper is a medium realized in the form of paper detectable by a detection system equipped with an exciting coil and a detecting coil. An alternating current is applied to the exciting coil to generate an alternating magnetic field, and the sheet S is placed in the alternating magnetic field. It is possible to detect the presence of the sheet S when magnetization reversal occurs. Therefore, by disposing the exciting coil and the detecting coil in a gate where persons or vehicles are able to pass, it is possible to detect the sheet S carried through the gate. Accordingly, it is possible to detect an unauthorized act of carrying the sheet S out. For example, if confidential information, etc. is printed on the sheet S, it is possible to prevent the leakage of the confidential information.

It is preferable if the functional member 154 exhibits a large Barkhausen effect. Specifically, the material of the functional member 154 is FeCr-based, FeCo-based, FeNi, FeSiB, or FeCoSiB-based alloy. These materials can be used suitably because they exhibit a large Barkhausen effect even without applying strain by post processing. Strain may be applied by post processing so as to impart large Barkhausen properties. The functional member 154 may be a wire formed by cutting an amorphous ribbon. The functional member 154 may be a glass-coated wire formed by drawing such amorphous metal together with glass from a molten state and by cooling them.

Preferably, the functional member 154 may have a longitudinally-long line-like shape such as a wire shape or a ribbon shape. Having a predetermined length relative to a cross-sectional area size makes it easier to exhibit a large Barkhausen effect.

Preferably, the diameter of the functional member 154 may be 10 μm or more and 100 μm or less when the functional member 154 has a wire shape. If the functional member 154 has a diameter of 10 μm or more, it is easier to exhibit a large Barkhausen effect. If the functional member 154 has a diameter of 100 μm or less, the functional member 154 does not become exposed from the sheet S. Moreover, if the functional member 154 has a diameter of 100 μm or less, it is possible to cut the functional member 154 with the cutter 138 easily.

Preferably, the thickness of the functional member 154 may be 10 μm or more and 100 μm or less when the functional member 154 has a ribbon shape. If the functional member 154 has a thickness of 10 μm or more, it is easier to exhibit a large Barkhausen effect. If the functional member 154 has a thickness of 100 μm or less, the functional member 154 does not become exposed from the sheet S. Moreover, if the functional member 154 has a thickness of 100 μm or less, it is possible to cut the functional member 154 with the cutter 138 easily. Preferably, the width of the functional member 154 may be, for example, 50 μm or more and 1,000 μm or less when the functional member 154 has a ribbon shape.

Preferably, the length of the functional member 154 may be 10 mm or more, or more preferably, 50 mm or more, when the functional member 154 has a wire shape or a ribbon shape. If the length of the functional member 154 is 10 mm or more, in synergy with the effect of shape anisotropy, it is easier to exhibit an NS reversal effect. Moreover, if the length of the functional member 154 is 10 mm or more, it is easier to place the functional member 154 at a desired position. There is no upper limit in the length of the functional member 154 except that it is not greater than the size of the cut sheet S. For example, the length of the functional member 154 is 200 mm or less.

With regard to the diameter and the length of the functional member 154, it is preferable if the diameter and the length of all of the functional members 154 included in the sheet S are within the ranges described above. However, if there is a distribution in the values of them, it is preferable if the average of the values of the diameter of them and the average of the values of the length of them are within the ranges described above. If the functional member 154 is bent, the minimum distance from one end of the functional member 154 to the other end thereof is defined as the length of the functional member 154.

It is possible to numerically define the functional members 154 in terms of, for example, weight in the sheet S cut by the cutting unit 90. For example, if the weight of the sheet S is expressed as 100 parts by weight, preferably, the weight of the functional member 154 may be 1.0 part by weight or less. In other words, the fibrous body manufacturing apparatus 100 manufactures the sheet S by performing cutting by the cutting unit 90 at a position where the weight of the functional member 154 is 1.0 part by weight or less when the weight of the sheet S is 100 parts by weight.

The sticky portion 156*b* is provided on the functional member 154. In the illustrated example, the sticky portion 156*b* made up of two sticky parts is provided on each one functional member 154. The sticky portion 156*b* is provided on one end and the other end of the functional member 154. The number of the sticky parts constituting the sticky portion 156*b* on each functional member 154 is not specifically limited. However, by providing the sticky portion 156*b* on one end and the other end of the functional member 154, it is possible to flexibly accommodate the stretching of the base sheet 152. The sticky portion 156*b* is the portion that remains after the removal of the base 156*a* from the adhesive tape 156. The sticky portion 156*b* is, for example, a so-called correction tape. The sticky portion 156*b* includes the adhesive layer 157 and a concealing layer 158.

The adhesive layer 157 bonds the functional member 154 to the base sheet 152. The adhesive layer 157 bonds the concealing layer 158 and the functional member 154 to the one side 152*a* of the base sheet 152. The material of the adhesive layer 157 is, for example, a natural rubber adhesive. Specifically, a tackifier and an oxidation inhibitor are added to natural rubber.

The concealing layer 158 is provided on the surface 157*a* of the adhesive layer 157. The concealing layer 158 hides the adhesive layer 157. That is, the concealing layer 158 makes it difficult for the adhesive layer 157 to be seen when viewed from the side where the one side 150*a* of the ground sheet 150 is present. The material of the concealing layer 158 is, for example, a mixture of methyl cyclohexane serving as a solvent, acrylic resin serving as a fixing agent, and titanium oxide serving as a pigment. The color of the concealing layer 158 is white because it contains titanium oxide, which is a white pigment. Therefore, when the color of the base sheet 152 and the color of the surface layer sheet 160 are white, this makes the concealing layer 158 hard to spot. The concealing layer 158 does not have adhesiveness.

The pigment contained in the concealing layer 158 can be selected to suit the color of the base sheet 152 and the color of the surface layer sheet 160. The solvent and the fixing agent contained in the concealing layer 158 can be selected to suit the pigment contained in the concealing layer 158.

Preferably, the concealing layer 158 and the adhesive layer 157 may be permeable to air. Each of the concealing layer 158 and the adhesive layer 157 is able to allow air to pass through a plurality of pores. The permeability of the concealing layer 158 and the adhesive layer 157 makes it easier to suck the fibers and the binder from the deposition unit 60 by the suction mechanism 76.

When the adhesive tape 156 is prepared in a roll shape as illustrated in FIG. 2, preferably, the adhesive tape 156 and a non-illustrated base tape may be formed into a roll in a stacked state. When the functional member 154 is to be temporarily fixed with the adhesive tape 156, the non-illustrated base tape should preferably be taken off the adhesive tape 156. This makes it possible to feed the adhesive tape 156 prepared in a roll shape onto the base sheet 152 easily.

The surface layer sheet 160 is provided on the one side 150*a* of the ground sheet 150. The base sheet 152, the functional member 154, and the adhesive tape 156 are covered by the surface layer sheet 160. The surface layer sheet 160 contains the fibers of the raw material supplied by the supplying unit 10 and the binder that is the resin supplied from the additive supply portion 52. The fibers and the binder contained in the surface layer sheet 160 are those discharged from the deposition unit 60. By being heated by the heating portion 84, the binder bonds the fibers discharged from the deposition unit 60 together and bonds, to the base sheet 152, the fibers discharged from the deposition unit 60. In addition, the binder bonds the functional member 154 and the base sheet 152 to each other. Furthermore, the binder bonds, to the functional member 154, the fibers discharged from the deposition unit 60.

Figure 6:
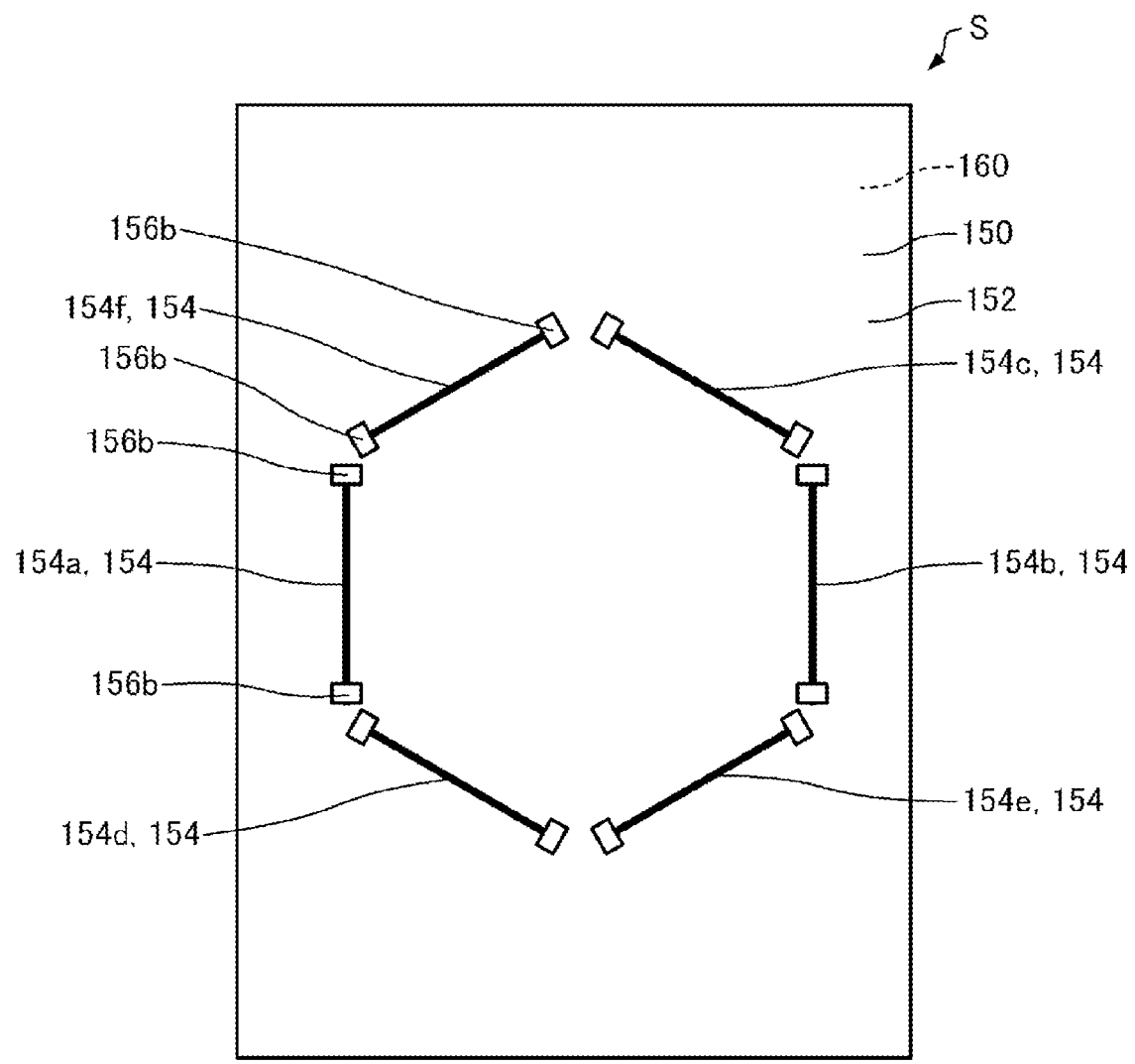
FIG. 6 is a schematic plan view of a sheet according to the first embodiment.
Figure 7:
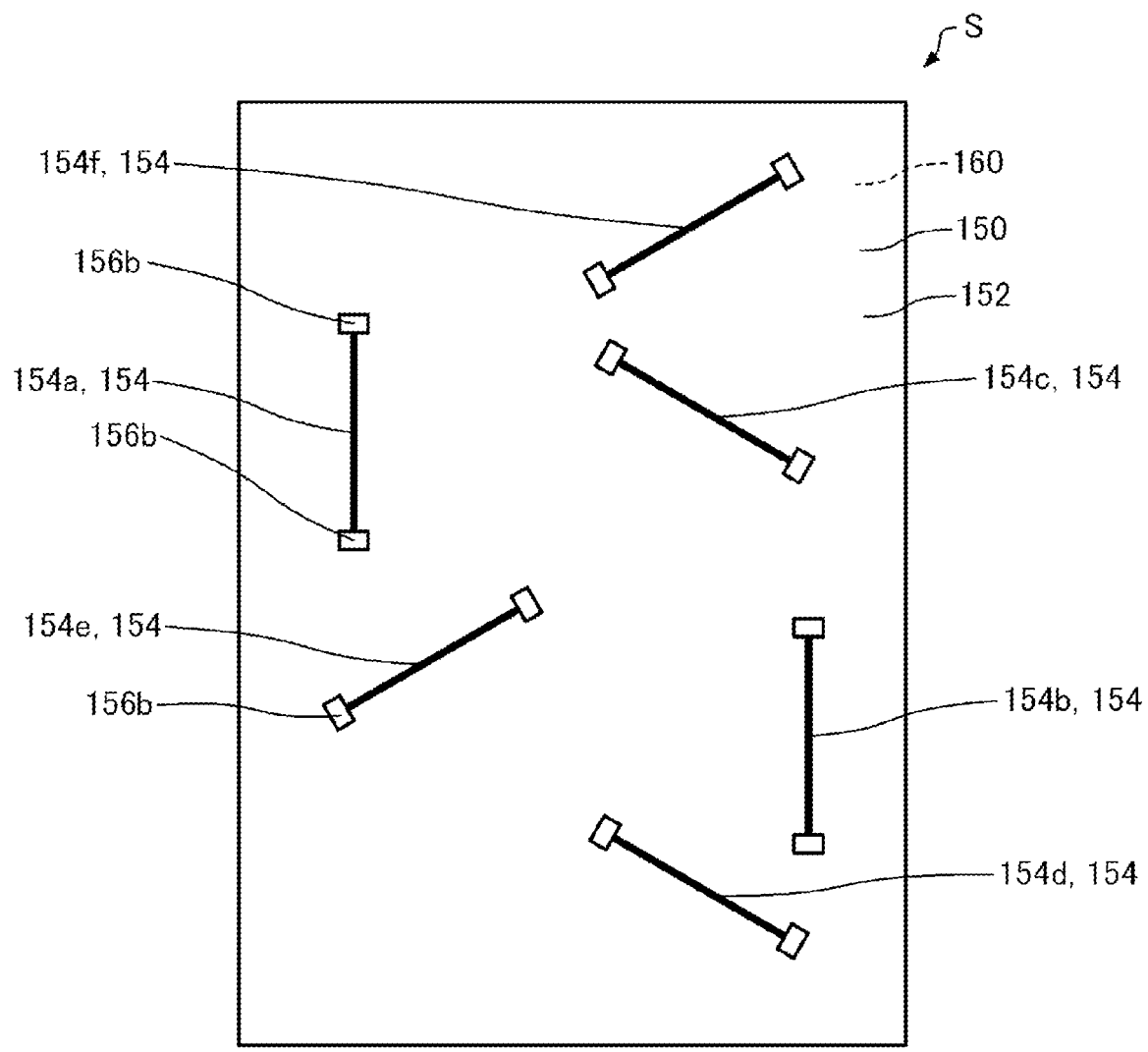
FIG. 7 is a schematic plan view of a sheet according to the first embodiment.

In the example illustrated in FIG. 4, the functional members 154 are arranged radially. However, the arrangement of the functional members 154 is not limited to such a radial layout. The arrangement of the functional members 154 may be modified as long as they do not overlap with one another. For example, in a state in which the functional members 154*a* and 154*b* have their longitudinal direction in the first direction, the functional members 154*c* and 154*d* have their longitudinal direction in the second direction, and the functional members 154*e* and 154*f* have their longitudinal direction in the third direction, the functional members 154 may be arranged in such a way as to surround the center of the base sheet 152 as illustrated in FIG. 6. Alternatively, the functional members 154 may be arranged randomly as illustrated in FIG. 7. By arranging the functional members 154 in such a way as to have different longitudinal directions, it is possible to make the functional members 154 easier to be detected, for example, as compared with a case where the functional members 154 have the same longitudinal direction.

The functional member 154 has been described as a magnetic body above. However, the functional member 154 does not have to be a magnetic body as long as the functional member 154 in the sheet S is detectable by external contactless detection. For example, the functional member 154 may be a metallic wire configured to be detected by a metal detector. The functional member 154 may be an RF (Radio Frequency) tag configured to be detected by an RFID (Radio Frequency Identification) reader. The functional member 154 may be an IC (Integrated Circuit) chip.

The sheet S may have a structure formed by providing a non-illustrated nonwoven fabric sheet on the surface of the surface layer sheet 160. To put it another way, the surface layer sheet 160 may be located between the base sheet 152 and the nonwoven fabric sheet. However, omitting such a sheet made of nonwoven fabric will be advantageous for reducing cost.

1.3. Method for Manufacturing Sheet

Figure 8:
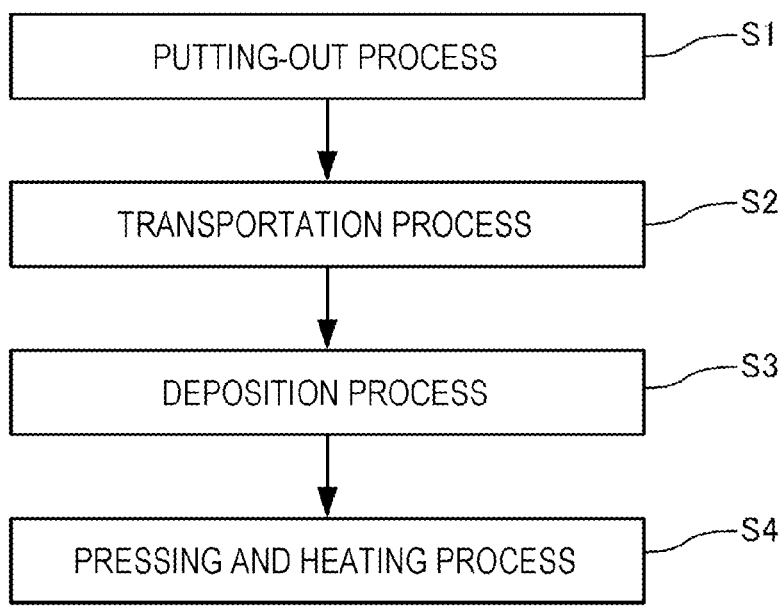
FIG. 8 is a flowchart for explaining a method for manufacturing a fibrous body according to the first embodiment.

Next, with reference to the accompanying drawings, a method for manufacturing the sheet S according to the first embodiment will now be explained. FIG. 8 is a flowchart for explaining a method for manufacturing the sheet S according to the first embodiment. The sheet S is manufactured using, for example, the fibrous body manufacturing apparatus 100 described above.

As illustrated in FIG. 8, the method for manufacturing the sheet S includes a putting-out process (step S1), a transportation process (step S2), a deposition process (step S3), and a pressing and heating process (step S4). The putting-out process (step S1) is a process of putting the ground sheet 150 out, with the functional member 154 placed on the one side 152a of the base sheet 152. The transportation process (step S2) is a process of transporting the ground sheet 150 having been put out. The deposition process (step S3) is a process of letting the fibers and the binder deposit on the one side 150a of the transported ground sheet 150, thereby forming the web W thereon. The pressing and heating process (step S4) is a process of applying pressure and heat to the web W.

The putting-out process (step S1) is executed by the putting-out unit 110 of the fibrous body manufacturing apparatus 100. The transportation process (step S2) is executed by the mesh belt 72. The deposition process (step S3) is executed by the deposition unit 60. The pressing and heating process (step S4) is executed by the sheet forming unit 80, which includes the pressing portion 82 and the heating portion 84.

In addition to the processes described above, the method for manufacturing the sheet S may include other processes executed by the components of the fibrous body manufacturing apparatus 100 described above.

1.4. Operational Effects

The fibrous body manufacturing apparatus 100 includes the putting-out unit 110, which puts the ground sheet 150 out, with the functional member 154 placed on the one side 152a of the base sheet 152, the mesh belt 72, which transports the ground sheet 150 put out onto itself, the deposition unit 60, which lets the fibers and the binder deposit on the one side 150a of the transported ground sheet 150, thereby forming the web W thereon, and the sheet forming unit 80, which applies pressure and heat to the web W. As described above, the fibrous body manufacturing apparatus 100 manufactures the sheet S, with the functional members 154 sandwiched between the base sheet 152 and the pressed and heated web W (the surface layer sheet 160). For this reason, the fibrous body manufacturing apparatus 100 is able to manufacture the sheet S that has a low risk of exposure of the functional member 154 on its surface even if, for example, the sheet S is bent or folded. Therefore, the sheet S manufactured by the fibrous body manufacturing apparatus 100 has high printability.

Moreover, the sheet S manufactured by the fibrous body manufacturing apparatus 100 offers higher print performance because printing is performed on its surface layer sheet 160 containing fibers, as compared with a case where, for example, printing is performed on a coat layer (a coat layer not containing fibers) provided on a sheet surface for the purpose of preventing a functional member from becoming exposed.

The fibrous body manufacturing apparatus 100 includes the suction mechanism 76, which is provided below the other side 150b of the ground sheet 150. The base sheet 152 is permeable to air. Therefore, in the fibrous body manufacturing apparatus 100, it is easier to suck the fibers and the binder from the deposition unit 60 by the suction mechanism 76, as compared with a case where the base sheet 152 is not permeable to air.

In the fibrous body manufacturing apparatus 100, the functional member 154 is bonded to the base sheet 152 by the adhesive layer 157, and the concealing layer 158 for hiding the adhesive layer 157 is provided on the surface 157a of the adhesive layer 157. Therefore, in the fibrous body manufacturing apparatus 100, as compared with a case where no concealing layer is provided, such a concealing structure makes it difficult for the adhesive layer 157 to be seen when viewed from the side where the one side 150a of the ground sheet 150 is present. Moreover, it is possible to reduce the risk of movement of the functional member 154 in relation to the base sheet 152 during the movement of the ground sheet 150.

For example, if a liquid adhesive is used for the bonding of the functional member, the adhesive will seep into the base sheet and spreads, resulting in a stain. Such a stain is obstructive to printing. If a wax is used for the bonding of the functional member, the wax will melt when heated by the heating portion, resulting in a stain, as is the case with a liquid adhesive. In the fibrous body manufacturing apparatus 100, it is possible to avoid the above problems because the adhesive layer 157 is used for the bonding.

The fibrous body manufacturing apparatus 100 includes the defibrating unit 20, which defibrates a raw material to form a defibrated material containing fibers, and the mixing unit 50, which forms a mixture by mixing the defibrated material with a binder. The deposition unit 60 lets the mixture deposit. Therefore, the fibrous body manufacturing apparatus 100 is able to let the mixture containing the defibrated material and the binder deposit on the mesh belt 72.

In the fibrous body manufacturing apparatus 100, another functional member 154b is arranged on the one side 152a of the base sheet 152, and the functional member 154a and this another functional member 154b do not overlap with each other. Therefore, the fibrous body manufacturing apparatus 100 is able to manufacture the sheet S that has a higher degree of flatness as compared with a case where a functional member and another functional member overlap with each other.

In the fibrous body manufacturing apparatus 100, the putting-out unit 110 includes the first placing portion 130, which arranges the functional members 154 on the base sheet 152. Therefore, the fibrous body manufacturing apparatus 100 is able to manufacture the ground sheet 150.

2. Second Embodiment

Figure 9:
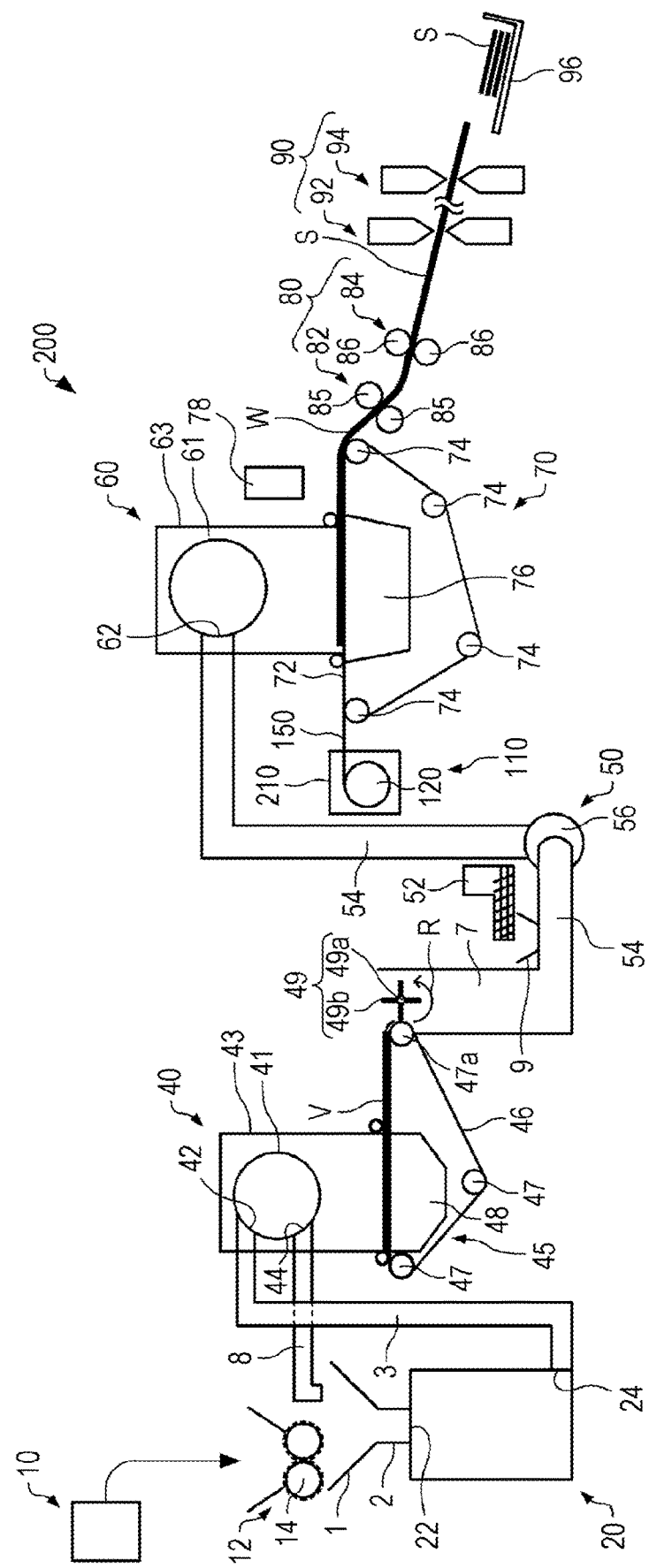
FIG. 9 is a schematic view of a fibrous body manufacturing apparatus according to a second embodiment.

Next, with reference to the accompanying drawings, a fibrous body manufacturing apparatus according to a second embodiment will now be explained. FIG. 9 is a schematic view of a fibrous body manufacturing apparatus 200 according to a second embodiment.

In the description of the fibrous body manufacturing apparatus 200 according to the second embodiment below, the same reference numerals are assigned to components having the same functions as those of the fibrous body manufacturing apparatus 100 according to the first embodiment described above, and a detailed explanation of them is omitted.

In the fibrous body manufacturing apparatus 100 described above, as illustrated in FIG. 1, the putting-out unit 110 includes the first placing portion 130 and the second placing portion 140. By contrast, in the fibrous body manufacturing apparatus 200, as illustrated in FIG. 9, the putting-out unit 110 does not include the first placing portion 130 and the second placing portion 140.

In the fibrous body manufacturing apparatus 200, the putting-out unit 110 includes a cabinet portion 210 inside which the ground sheet 150 is housed. The ground sheet 150, when housed, is in the shape of a roll. Namely, the first supplying roll 120 housed inside the cabinet portion 210 is a roll of the ground sheet 150. The cabinet portion 210, together with the ground sheet 150, is replaceable. Therefore, the user is able to select a desired ground sheet 150 and install the cabinet portion 210 onto the fibrous body manufacturing apparatus 200. In the fibrous body manufacturing apparatus 200, the putting-out unit 110 includes the cabinet portion 210 inside which the ground sheet 150 is housed, and the ground sheet 150, when housed, is in the shape of a roll. Therefore, it is unnecessary to provide the placing portions 130 and 140, resulting in a compact apparatus configuration.

3. Third Embodiment

3.1. Magnetic Sheet

Figure 10:
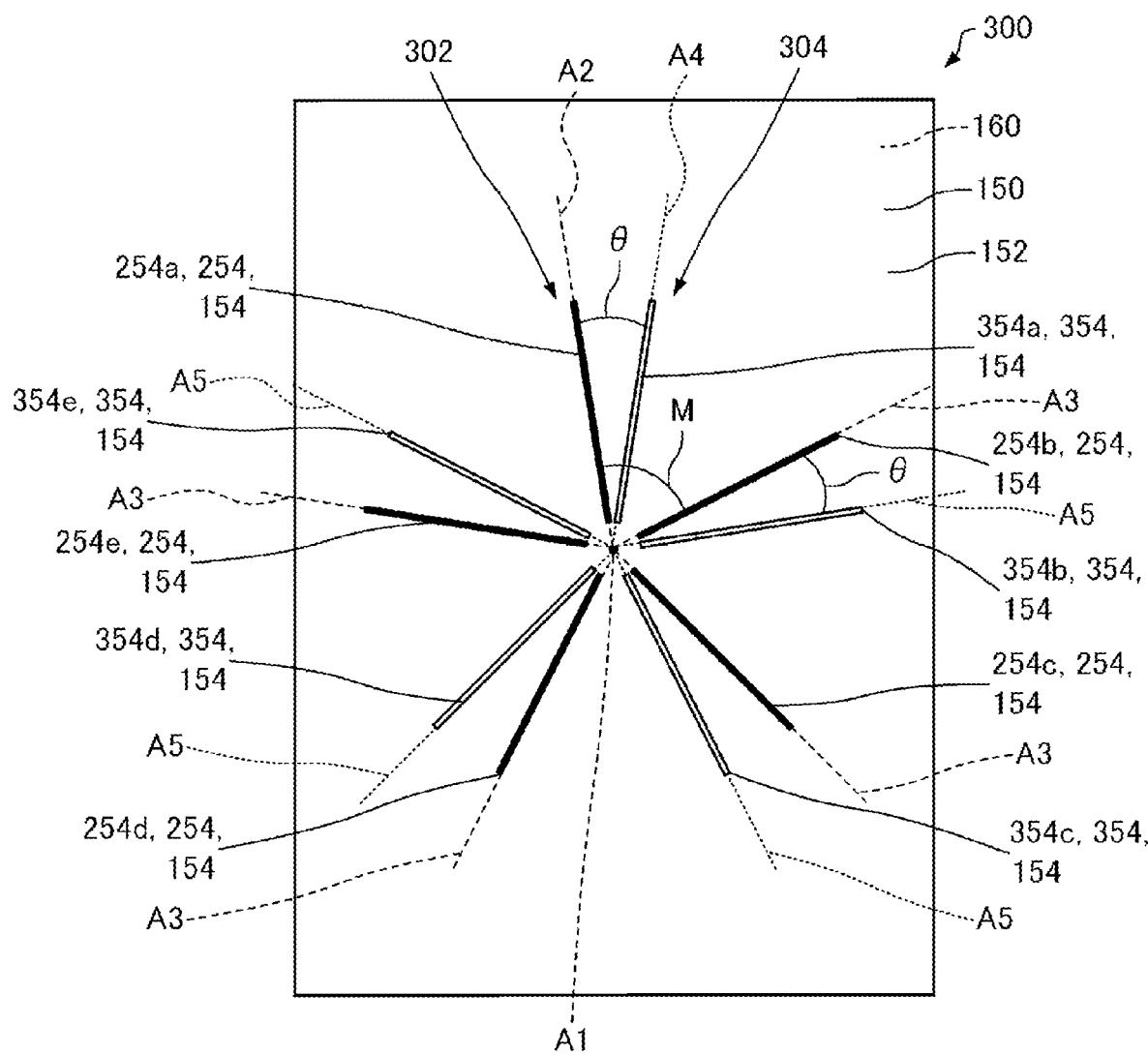
FIG. 10 is a schematic plan view of a magnetic sheet according to a third embodiment.

Next, with reference to the accompanying drawings, a magnetic sheet according to a third embodiment will now be explained. FIG. 10 is a schematic plan view of a magnetic sheet 300 according to a third embodiment. To facilitate an explanation, in FIG. 10, the sticky portion 156b is not illustrated.

In the description of the magnetic sheet 300 according to the third embodiment below, the same reference numerals are assigned to members having the same functions as those of the sheet S according to the first embodiment described above, and a detailed explanation of them is omitted.

In the magnetic sheet 300, as illustrated in FIG. 10, the layout of the functional members 154 is different from that of the sheet S described above. In the description below, it is assumed that the functional member 154 has magnetic properties, and the term "magnetic member" will be used for the functional member.

In the magnetic sheet 300, as illustrated in FIG. 10, first magnetic members 254 whose number is denoted as N, among the plurality of magnetic members 154, constitute a first group 302. Second magnetic members 354, the number of which is denoted as N, among the plurality of magnetic members 154, constitute a second group 304. The number N is an odd number that is equal to or greater than 3. Preferably, the number N may be an odd number that is equal to or greater than 3, but is equal to or less than 11. More preferably, the number N may be an odd number that is equal to or greater than 3, but is equal to or less than 7. In the illustrated example, the number N is 5.

A first magnetic member 254a, which is one of the N first magnetic members 254, is arranged along a second axis A2 when viewed in the direction of a first axis A1, which is perpendicular to the one side 152a of the base sheet 152. In the illustrated example, the longitudinal direction of the first magnetic member 254a is the direction of the second axis A2. The first axis A1 goes through the center of the base sheet 152. The first axis A1 is parallel to a line perpendicular to the one side 152a of the base sheet 152. The one side 152a is the principal plane of the base sheet 152. In the illustrated example, the first magnetic member 254a is arranged in a straight line without being bent. If the first magnetic member 254a is arranged with a bend, a virtual line connecting one end and the opposite end of the first magnetic member 254a goes straight along the second axis A2, though not illustrated.

Among the N first magnetic members 254, first magnetic members 254b, 254c, 254d, and 254e, the number of which is denoted as (N-1), are arranged along third axes A3, the number of which is also denoted as (N-1), wherein the third axes A3 are located at respective positions obtained by rotating the second axis A2 at angular intervals of (M±5)°. The first magnetic members 254b, 254c, 254d, and 254e constitute the rest of the N first magnetic members 254, that is, those other than the first magnetic member 254a arranged along the second axis A2. The first magnetic members 254b, 254c, 254d, and 254e may be arranged along the (N−1) third axes A3 located at respective positions obtained by rotating the second axis A2 at angular intervals of, preferably, (M±3)°, or more preferably, (M±1)°, or still more preferably, (M)°. The angle M satisfies the following equation: M=(360/N)°. In the illustrated example, the angle M is 72°.

In the illustrated example, the first magnetic member 254b is arranged along the third axis A3 located at the position obtained by rotating the second axis A2, along which the first magnetic member 254a is arranged, clockwise by an angle of 72°. The first magnetic member 254c is arranged along the third axis A3 located at the position obtained by rotating, clockwise by an angle of 72°, the third axis A3 along which the first magnetic member 254b is arranged. The first magnetic member 254d is arranged along the third axis A3 located at the position obtained by rotating, clockwise by an angle of 72°, the third axis A3 along which the first magnetic member 254c is arranged. The first magnetic member 254e is arranged along the third axis A3 located at the position obtained by rotating, clockwise by an angle of 72°, the third axis A3 along which the first magnetic member 254d is arranged. The first magnetic member 254a is in alignment with the second axis A2. Each of the first magnetic members 254b, 254c, 254d, and 254e is in alignment with the corresponding one of the third axes A3.

The extension lines of the N first magnetic members 254 intersect with one another at one point when viewed in the direction of the first axis A1. In the illustrated example, the extension lines of the N first magnetic members 254 intersect with one another at the point where the first axis A1 goes. The N first magnetic members 254 are arranged radially. The N first magnetic members 254 have an equal length. In the illustrated example, the shape of the first group 302 constituted by the five first magnetic members 254 has five-fold rotational symmetry.

One of the N second magnetic members 354 is arranged along a fourth axis A4, which is located at the position obtained by rotating the second axis A2 by a rotation angle θ, and the others of the N second magnetic members 354 are arranged along fifth axes A5, which are located at respective positions obtained by rotating the third axes A3 by the rotation angle θ respectively, with the first axis A1 taken as the center of rotation, where θ is not M/2°. In the illustrated example, since the angle M is 72°, the angle θ is not 36°. It is preferable if the angle θ satisfies the following equation: θ=M/4°.

In the illustrated example, the second magnetic member 354a is arranged along the fourth axis A4 located at the position obtained by rotating the second axis A2 by an angle of 18°, with the first axis A1 taken as the center of rotation. The second magnetic member 354b is arranged along the fifth axis A5 located at the position obtained by rotating the third axis A3 along which the first magnetic member 254b is arranged by an angle of 18°, with the first axis A1 taken as the center of rotation. The second magnetic member 354c is arranged along the fifth axis A5 located at the position obtained by rotating the third axis A3 along which the first magnetic member 254c is arranged by an angle of 18°, with the first axis A1 taken as the center of rotation. The second magnetic member 354d is arranged along the fifth axis A5 located at the position obtained by rotating the third axis A3 along which the first magnetic member 254d is arranged by an angle of 18°, with the first axis A1 taken as the center of rotation. The second magnetic member 354e is arranged along the fifth axis A5 located at the position obtained by rotating the third axis A3 along which the first magnetic member 254e is arranged by an angle of 18°, with the first axis A1 taken as the center of rotation.

The second group 304 constituted by the N second magnetic members 354 has a shape obtained by rotating the first group 302 constituted by the N first magnetic members 254 by the rotation angle θ, with the first axis A1 taken as the center of rotation. The longitudinal directions of the plurality of magnetic members 154 are different from one another when viewed in the direction of the first axis A1.

The N first magnetic members 254 do not overlap with one another when viewed in the direction of the first axis A1. The N second magnetic members 354 do not overlap with one another when viewed in the direction of the first axis A1. The first magnetic members 254 and the second magnetic members 354 do not overlap with each other when viewed in the direction of the first axis A1.

The magnetic sheet 300 is manufactured using a manufacturing method that includes a process of arranging the N first magnetic members 254 and the N second magnetic members 354 on the base sheet 152.

3.2. Operational Effects

The magnetic sheet 300 includes the base sheet 152, the line-shaped N first magnetic members 254 arranged on the base sheet 152 and having magnetic properties, and the line-shaped N second magnetic members 354 arranged on the base sheet 152 and having magnetic properties, where N denotes the number of the first magnetic members 254 and denotes the number of the second magnetic members 354. One of the N first magnetic members 254 is arranged along the second axis A2 when viewed in the direction of the first axis A1, which is perpendicular to the one side 152a of the base sheet 152. Among the N first magnetic members 254, the first magnetic members 254 other than the one arranged along the second axis A2 are arranged along the third axes A3, the number of which is denoted as (N-1), wherein the third axes A3 are located at respective positions obtained by rotating the second axis A2 at angular intervals of (M±5)° when viewed in the direction of the first axis A1. One of the N second magnetic members 354 is arranged along the fourth axis A4, which is located at the position obtained by rotating the second axis A2 by the rotation angle θ, and the second magnetic members 354 other than the one are arranged along the fifth axes A5, which are located at respective positions obtained by rotating the third axes A3 by the rotation angle θ respectively, with the first axis A1 taken as the center of rotation. The number N is an odd number that is equal to or greater than 3. The angle M satisfies an equation M=(360/N)°. The angle θ is not M/2°.

Therefore, in the magnetic sheet 300, it is possible to arrange the plurality of magnetic members 154 such that their longitudinal directions are different from one another when viewed in the direction of the first axis A1. Therefore, in the magnetic sheet 300, it is possible to make pulse signal intensity greater as compared with a case where the magnetic members have the same the longitudinal direction. When a magnetic sheet is detected using a detection device, depending on the longitudinal directions of magnetic members, a cancellation direction in which no pulse signal is detected exists. For this reason, if the magnetic members have the same the longitudinal direction, the longitudinal direction of the magnetic members behaves as a cancellation direction, and the pulse signals generated from the magnetic members will not be detected. This could result in a decrease in the pulse signal intensity of the magnetic sheet as a whole. In this respect, in the magnetic sheet 300, as described above, the magnetic members 154 are arranged such that their longitudinal directions are different from one another. For this reason, the longitudinal direction of one magnetic member 154 only could be the cancellation direction. Therefore, as compared with a case where the magnetic members have the same the longitudinal direction, it is possible to make pulse signal intensity greater while suppressing an increase in the number of the magnetic members 154.

In the magnetic sheet 300, an equation θ=(M/4)° is satisfied. Therefore, in the magnetic sheet 300, it is possible to make pulse signal intensity greater as compared with a case where an equation θ=(M/4)° is not satisfied, as will be described later in "4. Examples and Comparative Examples".

In the magnetic sheet 300, when viewed in the direction of the first axis A1, the N first magnetic members 254 do not overlap with one another, the N second magnetic members 354 do not overlap with one another, and the first magnetic members 254 and the second magnetic members 354 do not overlap with each other. Therefore, the magnetic sheet 300 has a higher degree of flatness as compared with a case where the magnetic members overlap.

In the magnetic sheet 300, the first magnetic members 254 and the second magnetic members 354 exhibit a large Barkhausen effect. Therefore, it is possible to detect the magnetic sheet 300 by means of a detection device.

3.3. Modification Examples

3.3.1. First Modification Example

Figure 11:
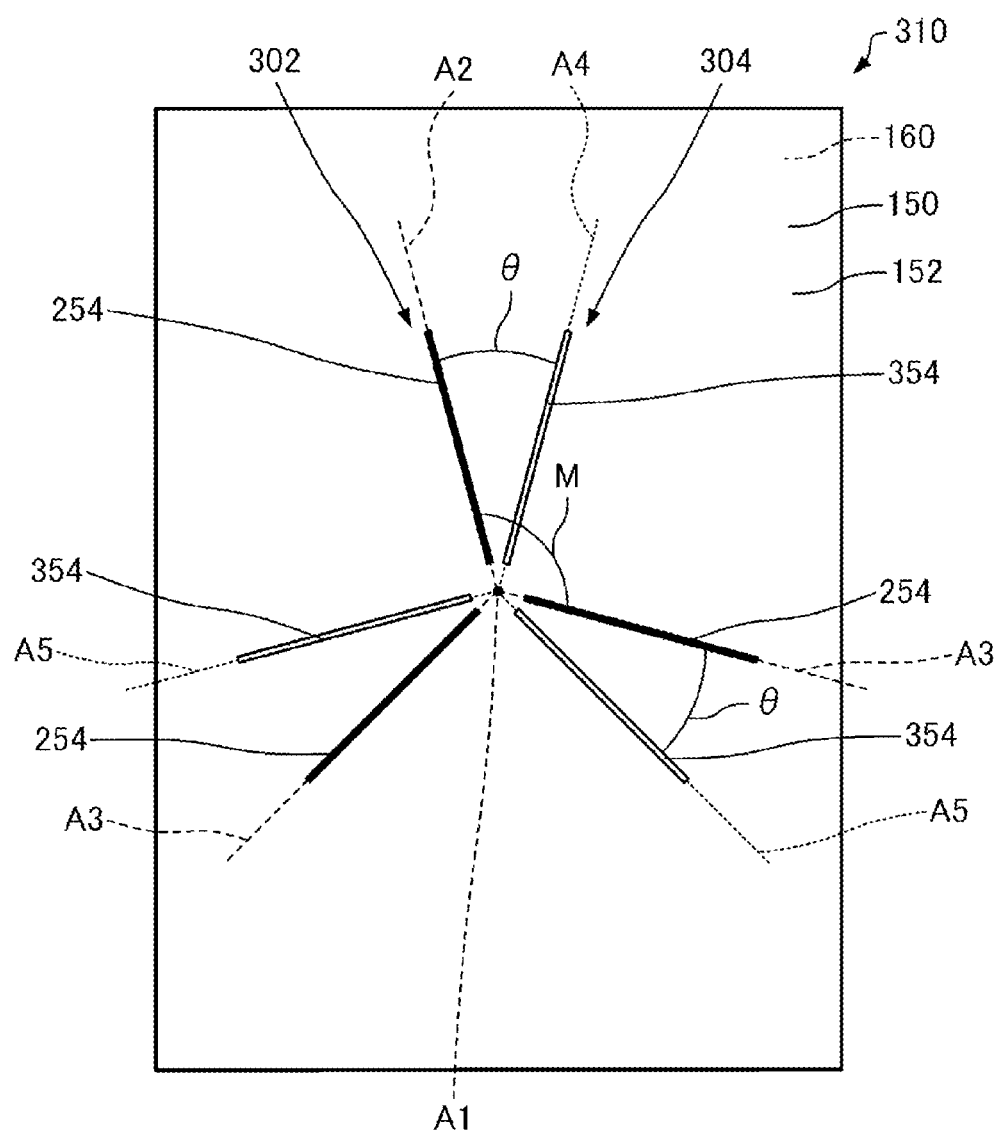
FIG. 11 is a schematic plan view of a magnetic sheet according to a first modification example of the third embodiment.

Next, with reference to the accompanying drawings, a magnetic sheet according to a first modification example of the third embodiment will now be explained. FIG. 11 is a schematic plan view of a magnetic sheet 310 according to a first modification example of the third embodiment.

In the description of the magnetic sheet 310 according to the first modification example of the third embodiment below, the same reference numerals are assigned to members having the same functions as those of the magnetic sheet 300 according to the third embodiment described above, and a detailed explanation of them is omitted. The same holds true for a magnetic sheet according to second, third, and fourth modification examples of the third embodiment that will be described later.

In the magnetic sheet 300 described above, N=5 as illustrated in FIG. 10. That is, five first magnetic members 254 are provided, and five second magnetic members 354 are provided.

In the magnetic sheet 310 modified from the foregoing example, N=3 as illustrated in FIG. 11. That is, three first magnetic members 254 are provided, and three second magnetic members 354 are provided. The magnetic sheet 310 in which N=3 can be manufactured at a lower cost than, for example, the magnetic sheet 300 in which N=5.

Figure 12:
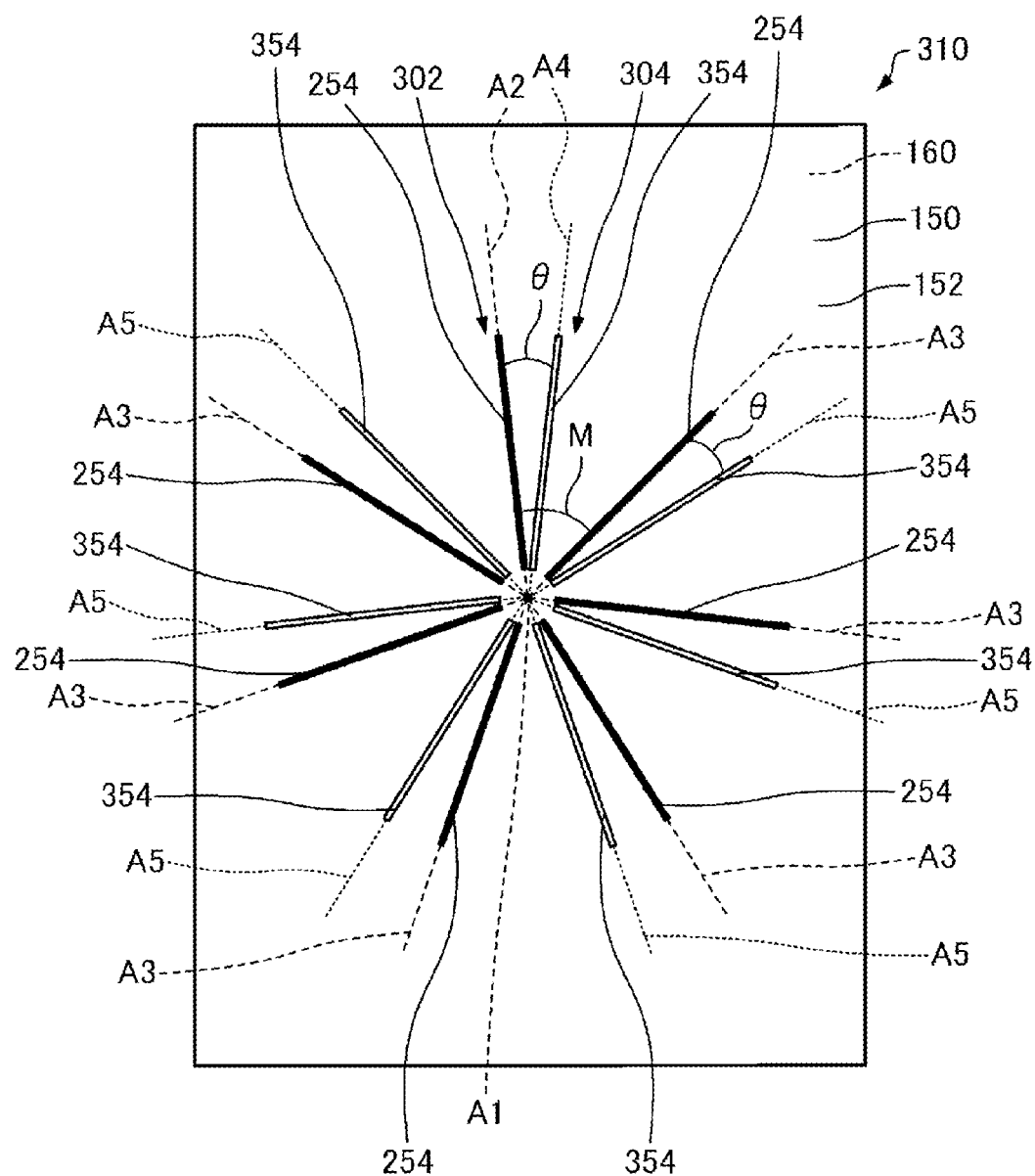
FIG. 12 is a schematic plan view of a magnetic sheet according to the first modification example of the third embodiment.

The number of the first magnetic members 254, and of the second magnetic members 354, is not specifically limited. For example, the number may be N=7 as illustrated in FIG. 12. That is, seven first magnetic members 254 may be provided, and seven second magnetic members 354 may be provided. The magnetic sheet 310 in which N=7 makes it possible to make pulse signal intensity greater than, for example, the magnetic sheet 300 in which N=5.

3.3.2. Second Modification Example

Figure 13:
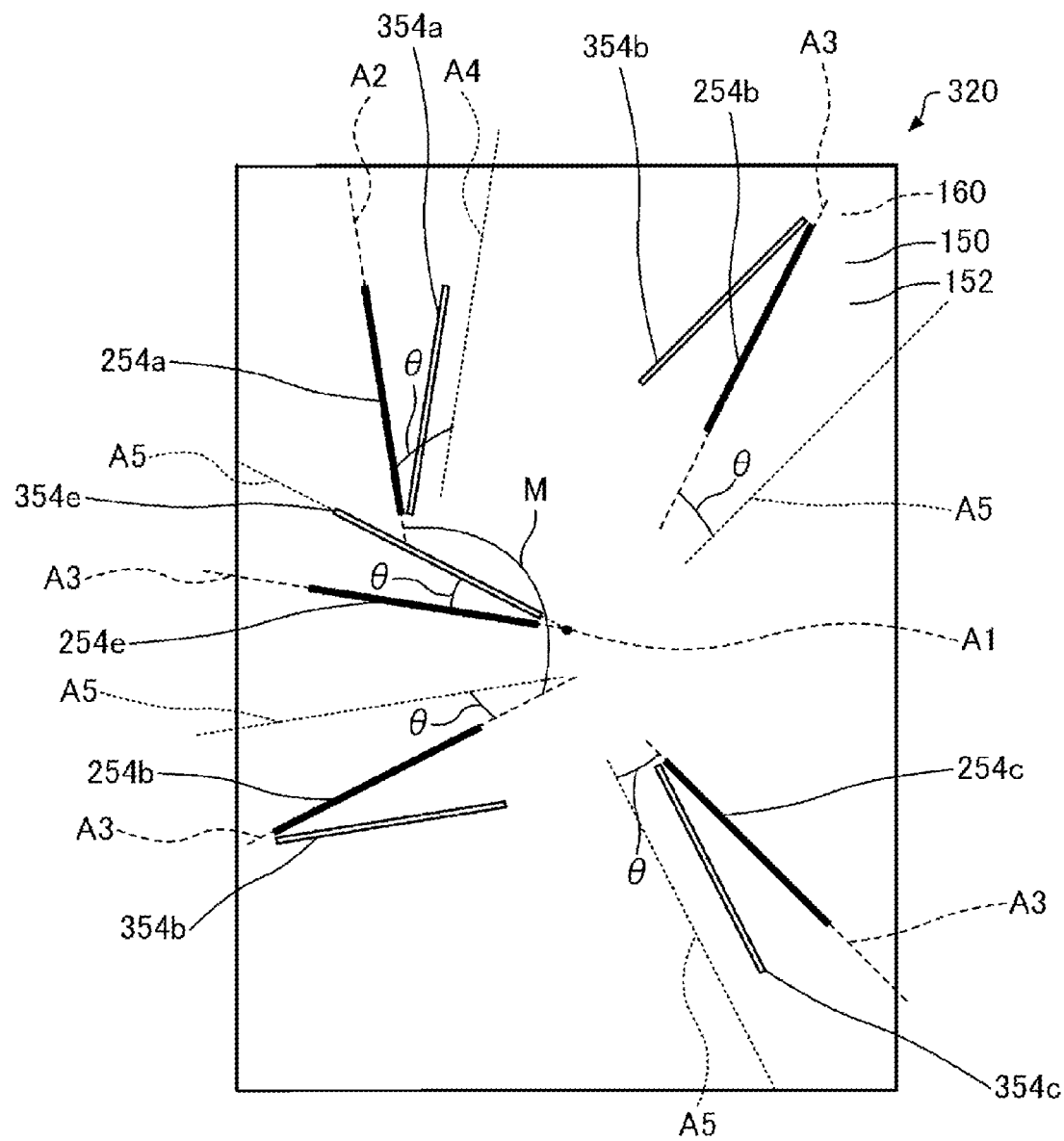
FIG. 13 is a schematic plan view of a magnetic sheet according to a second modification example of the third embodiment.

Next, with reference to the accompanying drawings, a magnetic sheet according to a second modification example of the third embodiment will now be explained. FIG. 13 is a schematic plan view of a magnetic sheet 320 according to a second modification example of the third embodiment.

In the magnetic sheet 300 described above, as illustrated in FIG. 10, the extension lines of the five first magnetic members 254 intersect with one another at one point when viewed in the direction of the first axis A1, specifically, at the point where the first axis A1 goes.

By contrast, in the magnetic sheet 320, as illustrated in FIG. 13, the extension lines of the five first magnetic members 254 do not intersect with one another at one point when viewed in the direction of the first axis A1. The shape of the first group 302 constituted by the five first magnetic members 254 has one-fold rotational symmetry. As illustrated in FIG. 13, the five first magnetic members 254 are arranged in a scattered state. The second magnetic member 354a is not in alignment with the fourth axis A4. Each of the second magnetic members 354b 354c, and 354d is not in alignment with the corresponding one of the fifth axes A5.

In the magnetic sheet 320, since the extension lines of the N first magnetic members 254 do not intersect with one another at one point when viewed in the direction of the first axis A1, it is possible to make pulse signal intensity greater as compared with a case where the extension lines of the N first magnetic members 254 intersect with one another at one point as will be described later in "4. Examples and Comparative Examples".

3.3.3. Third Modification Example

Figure 14:
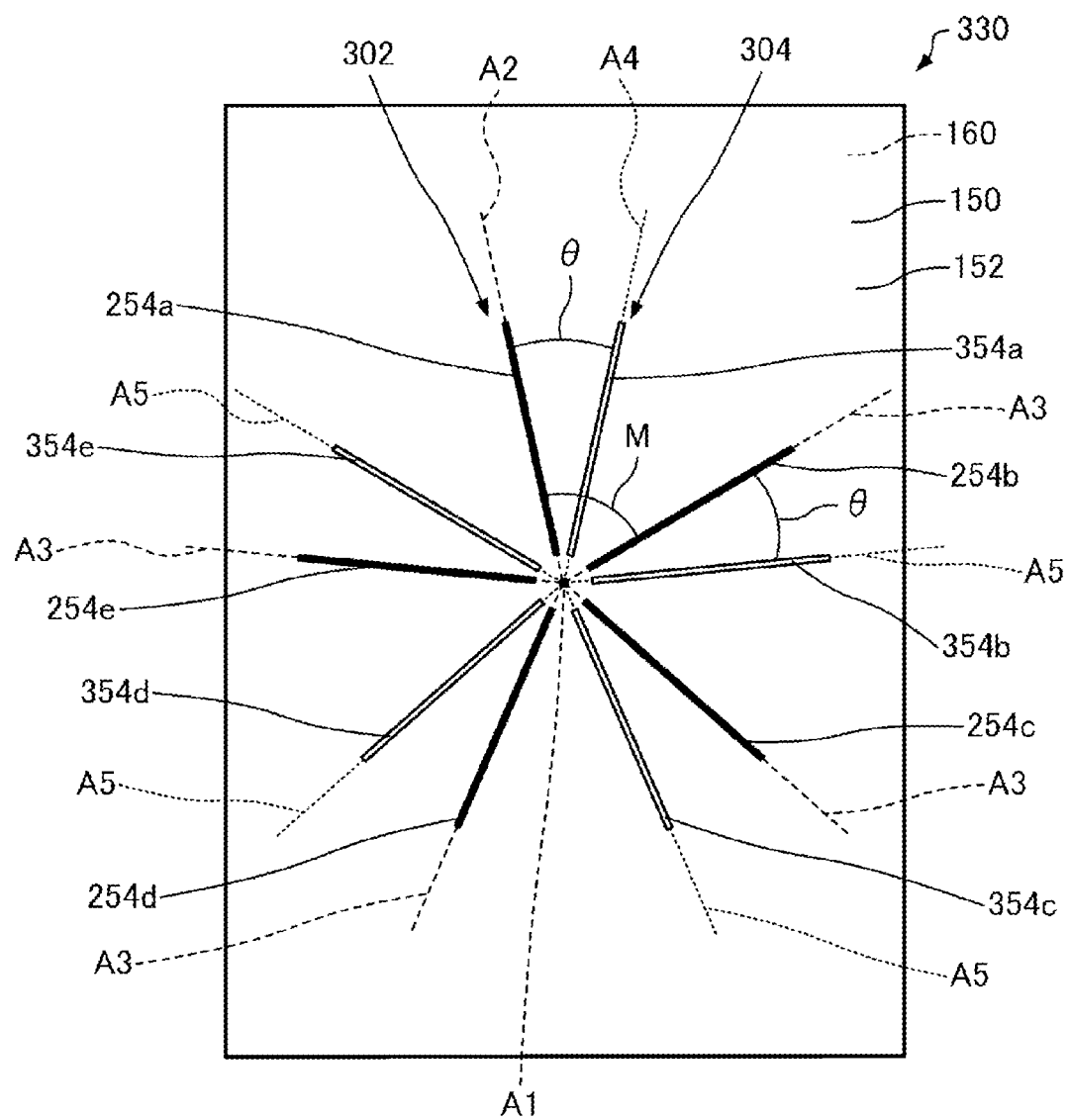
FIG. 14 is a schematic plan view of a magnetic sheet according to a third modification example of the third embodiment.

Next, with reference to the accompanying drawings, a magnetic sheet according to a third modification example of the third embodiment will now be explained. FIG. 14 is a schematic plan view of a magnetic sheet 330 according to a third modification example of the third embodiment.

In the magnetic sheet 300 described above, as illustrated in FIG. 10, an equation $\theta=(M/4)°$ is satisfied, specifically, $\theta=18°$.

By contrast, in the magnetic sheet 330, as illustrated in FIG. 14, an equation $\theta=(M/4)°$ is not satisfied, specifically, $\theta=25°$.

3.3.4. Fourth Modification Example

Figure 15:
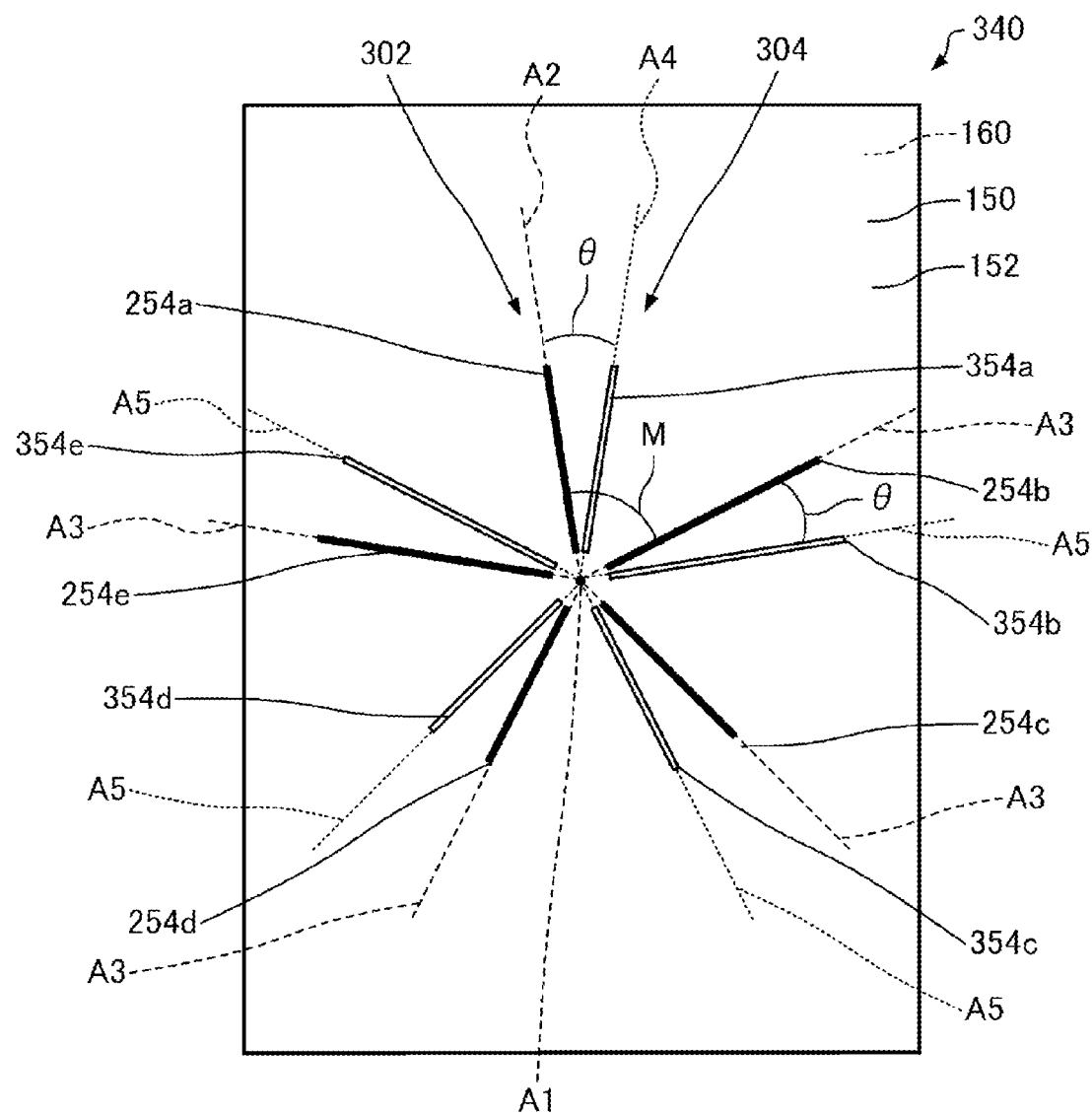
FIG. 15 is a schematic plan view of a magnetic sheet according to a fourth modification example of the third embodiment.

Next, with reference to the accompanying drawings, a magnetic sheet according to a fourth modification example of the third embodiment will now be explained. FIG. 15 is a schematic plan view of a magnetic sheet 340 according to a fourth modification example of the third embodiment.

In the magnetic sheet 300 described above, as illustrated in FIG. 10, the N first magnetic members 254 have the same length as one another.

By contrast, in the magnetic sheet 340, as illustrated in FIG. 15, the N first magnetic members 254 do not have the same length as one another. In the illustrated example, the first magnetic members 254a, 254c, and 254d are shorter than the first magnetic members 254b and 254e.

4. Examples and Comparative Examples

4.1. Preparation of Samples

4.1.1. Example 1

Magnetic wires were arranged on nonwoven fabric. The magnetic wires were temporarily fixed using a correction tape. The number of first magnetic wires, an example of first magnetic members, is three, and the number of second magnetic wires, an example of second magnetic members, is three, as illustrated in FIG. 11. That is, N=3, and M=120°. The angle $\theta$ is: $\theta=(M/4)°$. Specifically, $\theta=30°$. The length of each first magnetic wire is equal to the length of each second magnetic wire. The extension lines of the N first magnetic wires intersect with one another at one point.

Next, an A4-sized magnetic sheet was produced by forming a surface layer sheet, by using an in-office dry papermaking system "PaperLab A-8000" manufactured by Seiko Epson Corporation on the nonwoven fabric on which the magnetic wires had been arranged.

4.1.2. Example 2

In Example 2, as illustrated in FIG. 10, the sheet was produced in the same manner as Example 1 except that the number of the first magnetic wires is five and the number of the second magnetic wires is five. That is, N=5, M=72°, and $\theta=18°$.

4.1.3. Example 3

In Example 3, as illustrated in FIG. 12, the sheet was produced in the same manner as Example 1 except that the number of the first magnetic wires is seven and the number of the second magnetic wires is seven. That is, N=7, M=51.4°, and $\theta=12.9°$.

4.1.4. Example 4

In Example 4, as illustrated in FIG. 13, the sheet was produced in the same manner as Example 2 except that the first magnetic wires were arranged such that the extension lines of the first magnetic wires do not intersect with one another at one point.

4.1.5. Example 5

In Example 5, as illustrated in FIG. 14, the sheet was produced in the same manner as Example 2 except for $\theta=25°$.

4.1.6. Example 6

In Example 6, as illustrated in FIG. 15, the sheet was produced in the same manner as Example 2 except that three of the five first magnetic wires are shorter.

4.1.7. Comparative Example 1

Figure 16:
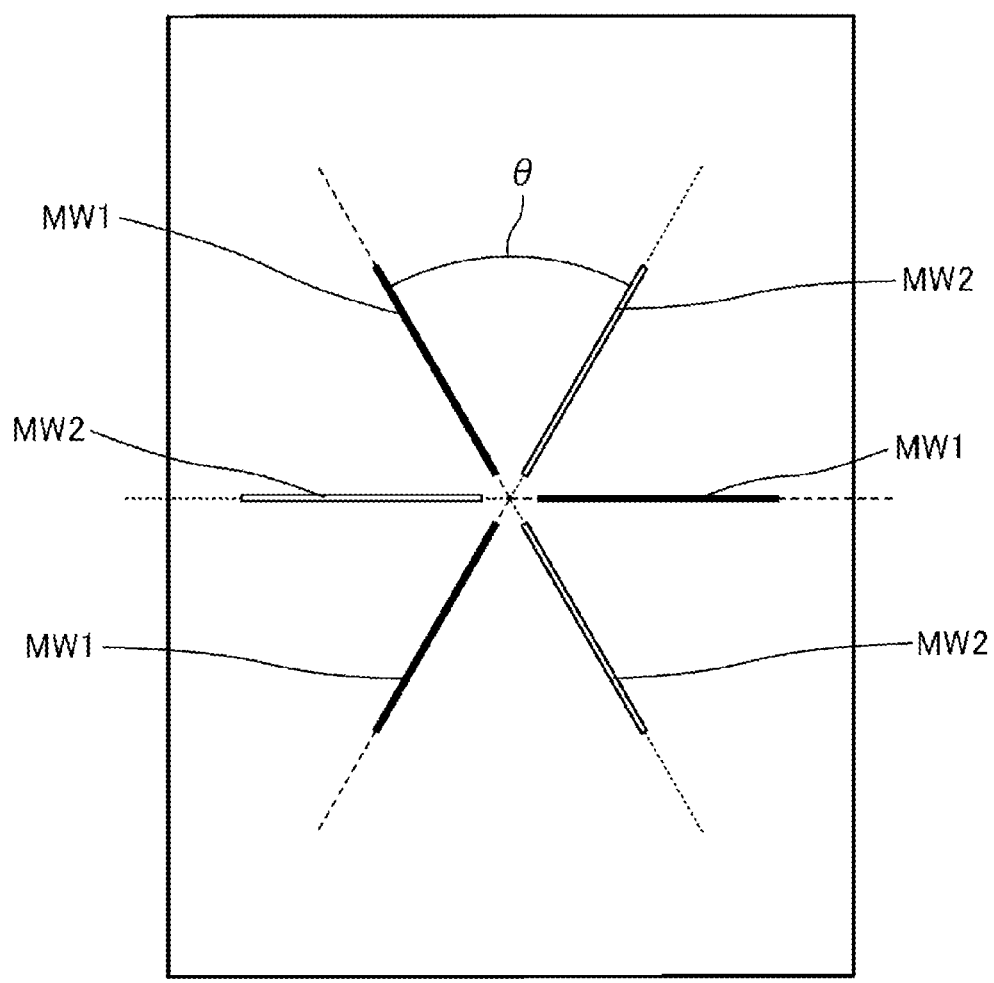
FIG. 16 is a schematic plan view of Comparative Example 1.

In Comparative Example 1, as illustrated in FIG. 16, the sheet was produced in the same manner as Example 1 except for θ=(M/2)°, specifically, θ=60°.

4.1.8. Comparative Example 2

Figure 17:
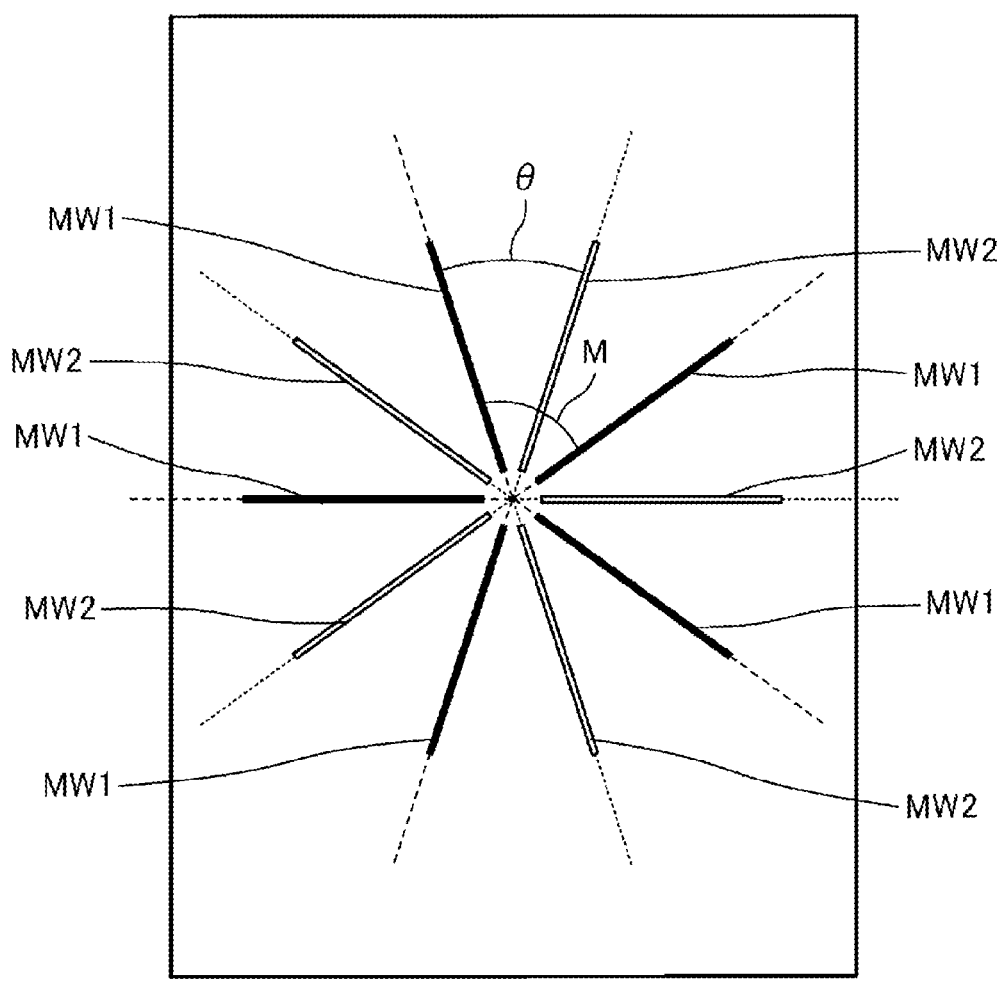
FIG. 17 is a schematic plan view of Comparative Example 2.

In Comparative Example 2, as illustrated in FIG. 17, the sheet was produced in the same manner as Example 2 except for θ=(M/2)°, specifically, θ=36°.

4.1.9. Comparative Example 3

Figure 18:
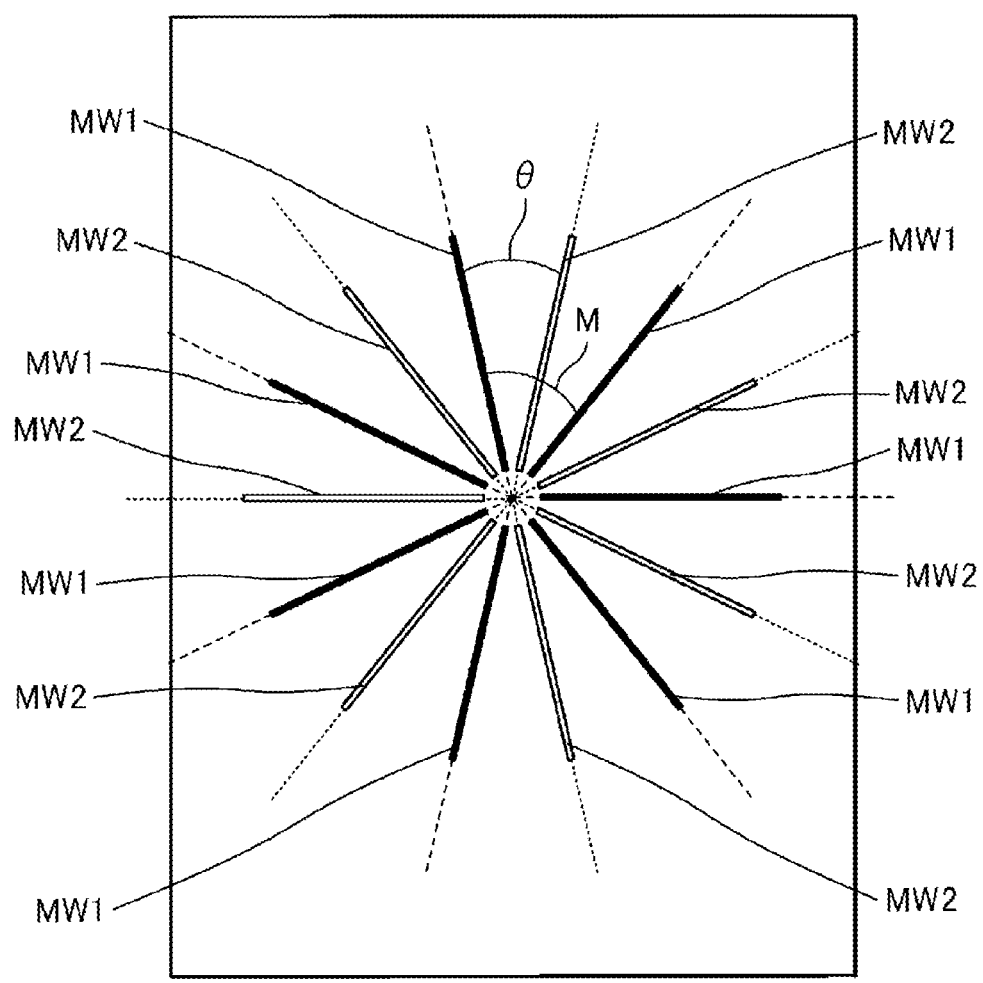
FIG. 18 is a schematic plan view of Comparative Example 3.

In Comparative Example 3, as illustrated in FIG. 18, the sheet was produced in the same manner as Example 3 except for θ=(M/2)°, specifically, θ=25.7°.

FIGS. 16, 17, and 18 are schematic plan views of Comparative Examples 1, 2, and 3 respectively. In FIGS. 16, 17, and 18, the first magnetic wires are denoted as "MW1", and the second magnetic wires are denoted as "MW2".

4.2. Evaluation of Pulse Signal Intensity

The pulse signal intensity of Examples 1 to 6 and Comparative Examples 1 to 3 was evaluated. An oscillating electric current of 1 kHz was applied to an exciting coil (the number of turns in the coil: 150) whose size is larger than A4. Spike noise caused by magnetization reversal of the magnetic wire was detected as pulse signal intensity, that is, as gate sensitivity, using a detecting coil (the number of turns in the coil: 150) located at a distance of 800 mm from the exciting coil.

FIG. 19 is a graph that shows the pulse signal intensity of Examples 1 to 6 and Comparative Examples 1 to 3.

As can be seen from a comparison of Example 1 and Comparative Example 1 in FIG. 19, the experiment revealed that the gate sensitivity decreases if two magnetic wires have the same the longitudinal direction as each other. The same can be seen also from a comparison of Example 2 and Comparative Example 2 and from a comparison of Example 3 and Comparative Example 3.

As can be seen from a comparison of Example 2 and Example 4, the experiment revealed that the gate sensitivity in a case where the extension lines of the N first magnetic wires do not intersect with one another at one point is higher than the gate sensitivity in a case where the extension lines of the N first magnetic wires intersect with one another at one point.

As can be seen from a comparison of Example 2 and Example 5, the experiment revealed that the gate sensitivity in a case where an equation θ=(M/4)° is satisfied is higher than the gate sensitivity in a case where an equation θ=(M/4)° is not satisfied.

As can be seen from a comparison of Example 2 and Example 6, the experiment revealed that the gate sensitivity decreases if some magnetic wires are short.

As can be seen from a comparison of Example 1, Example 2, and Example 3, the experiment revealed that the larger the number of the magnetic wires is, the higher the gate sensitivity tends to be.

The foregoing exemplary embodiments and the modification examples are just examples. The scope of the present disclosure is not limited to these examples. For example, the foregoing exemplary embodiment(s) and the modification example(s) may be combined as needed.

The present disclosure encompasses every structure that is substantially the same as the structure described in the foregoing exemplary embodiments, for example, structure with the same function, method, and result, or structure with the same object and effect. The present disclosure encompasses every structure that is obtained by replacement of a non-essential part(s) in the structure described in the foregoing exemplary embodiments. The present disclosure encompasses every structure that produces the same operational effect as that of the structure described in the foregoing exemplary embodiments, or structure that achieves the same object as that of the structure described in the foregoing exemplary embodiments. The present disclosure encompasses every structure that is obtained by addition of known art to the structure described in the foregoing exemplary embodiments.

The following content of disclosure can be derived from the foregoing exemplary embodiments and modification examples.

A magnetic sheet according to a certain aspect of the disclosed embodiments includes: a sheet; and line-shaped N first magnetic members arranged on the sheet and having magnetic properties, and line-shaped N second magnetic members arranged on the sheet and having magnetic properties, where N denotes number of the first magnetic members and denotes number of the second magnetic members; wherein one of the N first magnetic members is arranged along a second axis when viewed in a direction of a first axis that is perpendicular to the sheet, among the N first magnetic members, first magnetic members other than the one arranged along the second axis are arranged along third axes, number of which is denoted as (N-1), wherein the third axes are located at respective positions obtained by rotating the second axis at angular intervals of (M±5)° when viewed in the direction of the first axis, and one of the N second magnetic members is arranged along a fourth axis that is located at a position obtained by rotating the second axis by a rotation angle θ, and second magnetic members other than the one are arranged along fifth axes that are located at respective positions obtained by rotating the third axes by the rotation angle θ respectively, with the first axis taken as the center of rotation, where, N is an odd number that is equal to or greater than 3, M satisfies an equation M=(360/N)°, and θ is not M/2°.

This magnetic sheet makes it possible to heighten pulse signal intensity while suppressing an increase in the number of the magnetic members.

In the magnetic sheet according to the above aspect, an equation θ=(M/4)° may be satisfied.

This magnetic sheet makes it possible to heighten pulse signal intensity.

In the magnetic sheet according to the above aspect, when viewed in the direction of the first axis, the N first magnetic members may be configured not to overlap with one another, the N second magnetic members may be configured not to overlap with one another, and the first magnetic members and the second magnetic members may be configured not to overlap with each other.

This magnetic sheet is able to offer a higher degree of flatness.

In the magnetic sheet according to the above aspect, the first magnetic members and the second magnetic members may exhibit a large Barkhausen effect.

Because of the large Barkhausen effect, this magnetic sheet is detectable by means of a detection device.

In the magnetic sheet according to the above aspect, when viewed in the direction of the first axis, extension lines of the N first magnetic members may be configured not to intersect with one another at one point.

This magnetic sheet makes it possible to heighten pulse signal intensity.

A method for manufacturing a magnetic sheet according to a certain aspect of the disclosed embodiments includes: arranging, on a sheet, line-shaped N first magnetic members having magnetic properties, where N denotes number of the first magnetic members; and arranging, on the sheet, line-shaped N second magnetic members having magnetic properties, where N denotes number of the second magnetic members; wherein in the arranging of the first magnetic members and the arranging of the second magnetic members, one of the N first magnetic members is arranged along a second axis when viewed in a direction of a first axis that is perpendicular to the sheet, among the N first magnetic members, first magnetic members other than the one arranged along the second axis are arranged along third axes, number of which is denoted as (N-1), wherein the third axes are located at respective positions obtained by rotating the second axis at angular intervals of $(M\pm5)°$ when viewed in the direction of the first axis, and one of the N second magnetic members is arranged along a fourth axis that is located at a position obtained by rotating the second axis by a rotation angle $\theta$, and second magnetic members other than the one are arranged along fifth axes that are located at respective positions obtained by rotating the third axes by the rotation angle $\theta$ respectively, with the first axis taken as the center of rotation, where, N is an odd number that is equal to or greater than 3, M satisfies an equation $M=(360/N)°$, and $\theta$ is not $M/2°$.

What is claimed is:

1. A magnetic sheet, comprising:
    a sheet; and
    line-shaped N first magnetic members arranged on the sheet and having magnetic properties, and line-shaped N second magnetic members arranged on the sheet and having magnetic properties, where N denotes number of the first magnetic members and denotes number of the second magnetic members; wherein
    one of the N first magnetic members is arranged along a second axis when viewed in a direction of a first axis that is perpendicular to a principal plane of the sheet,
    among the N first magnetic members, first magnetic members other than the one arranged along the second axis are arranged along third axes, number of which is denoted as (N-1), wherein the third axes are located at respective positions obtained by rotating the second axis at angular intervals of $(M\pm5)°$ when viewed in the direction of the first axis, and
    one of the N second magnetic members is arranged along a fourth axis that is located at a position obtained by rotating the second axis by a rotation angle $\theta$, and second magnetic members other than the one are arranged along fifth axes that are located at respective positions obtained by rotating the third axes by the rotation angle $\theta$ respectively, with the first axis taken as the center of rotation,
    where,
    N is an odd number that is equal to or greater than 3,
    M satisfies an equation $M=(360/N)°$, and
    $\theta$ is not $M/2°$.

2. The magnetic sheet according to claim 1, wherein an equation $\theta=(M/4)°$ is satisfied.

3. The magnetic sheet according to claim 1, wherein when viewed in the direction of the first axis,
    the N first magnetic members do not overlap with one another,
    the N second magnetic members do not overlap with one another, and
    the first magnetic members and the second magnetic members do not overlap with each other.

4. The magnetic sheet according to claim 1, wherein the first magnetic members and the second magnetic members exhibit a Barkhausen effect.

5. The magnetic sheet according to claim 1, wherein when viewed in the direction of the first axis, extension lines of the N first magnetic members do not intersect with one another at one point.

* * * * *